Sept. 28, 1954     C. V. ALLANDER     2,690,146
AUTOMATIC MACHINE FOR STITCHING NECKTIES
Filed Dec. 21, 1949                              25 Sheets-Sheet 1

Inventor:
Claës Vilhelm Allander
by his Attorneys,
Daily & Daily

Sept. 28, 1954 C. V. ALLANDER 2,690,146
AUTOMATIC MACHINE FOR STITCHING NECKTIES
Filed Dec. 21, 1949 25 Sheets-Sheet 4

Inventor:
Claës Vilhelm Allander
by his Attorneys,
Darby & Darby

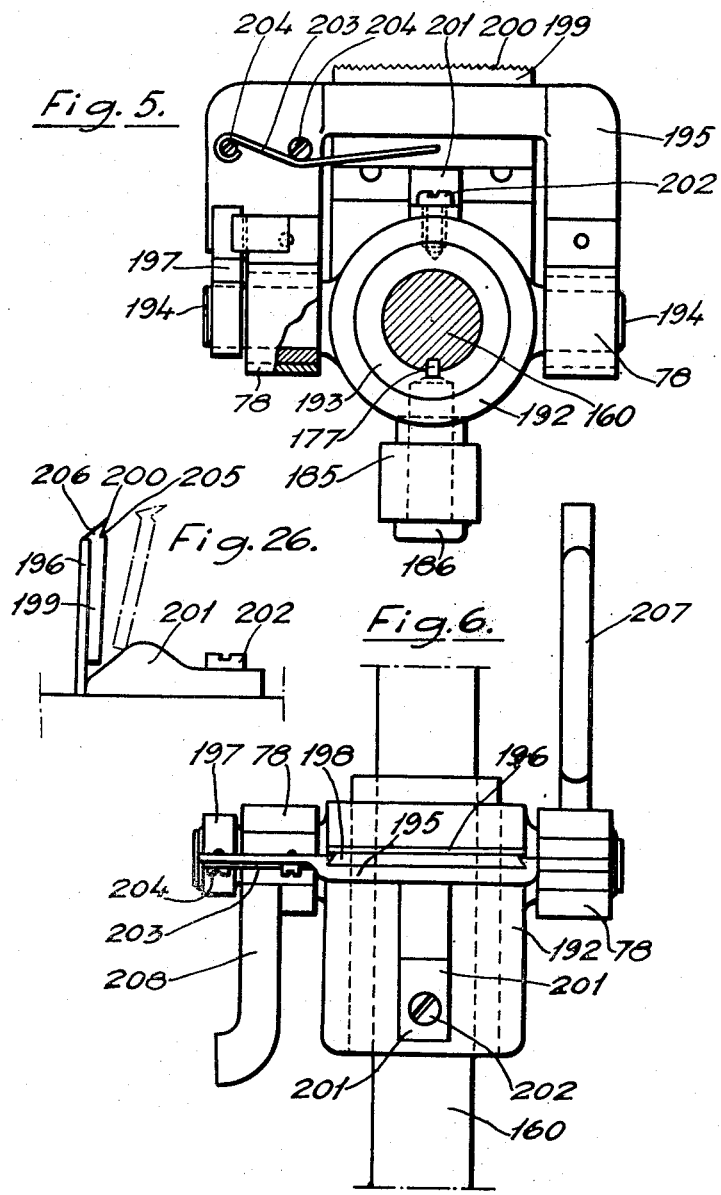

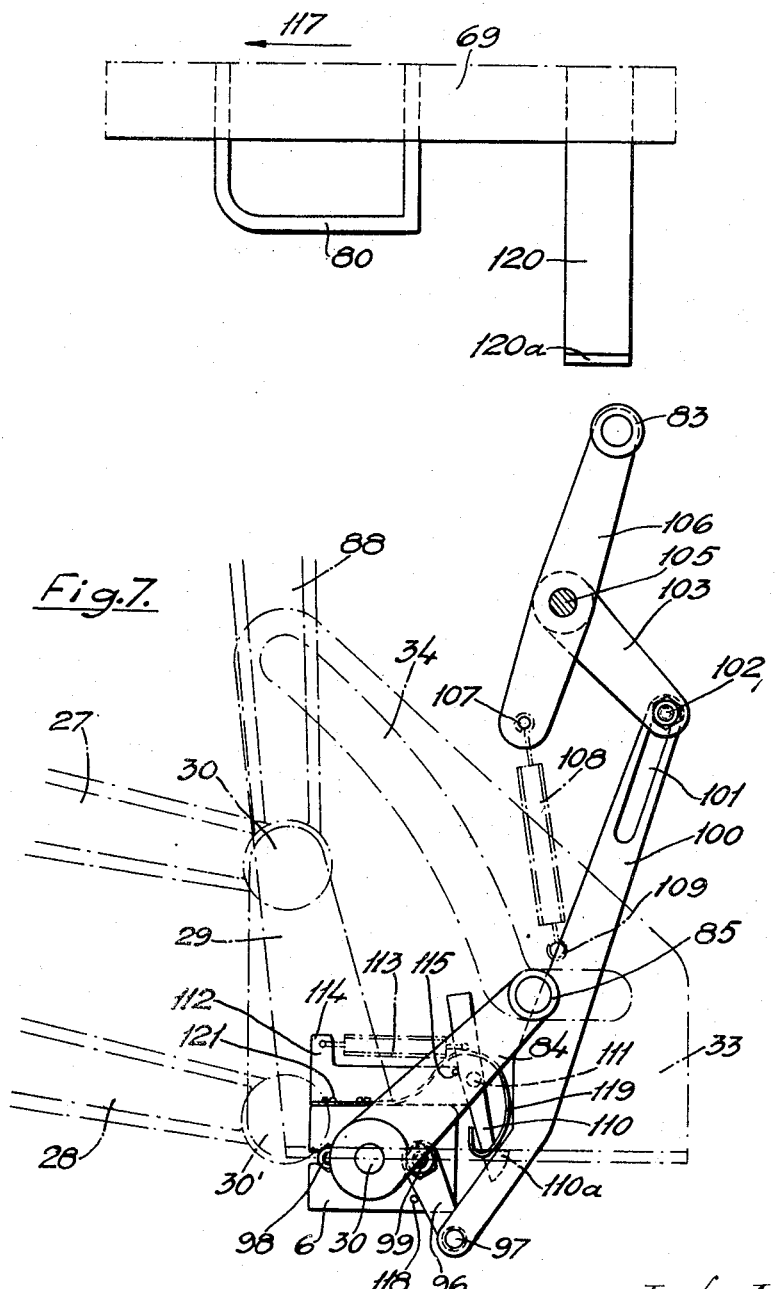

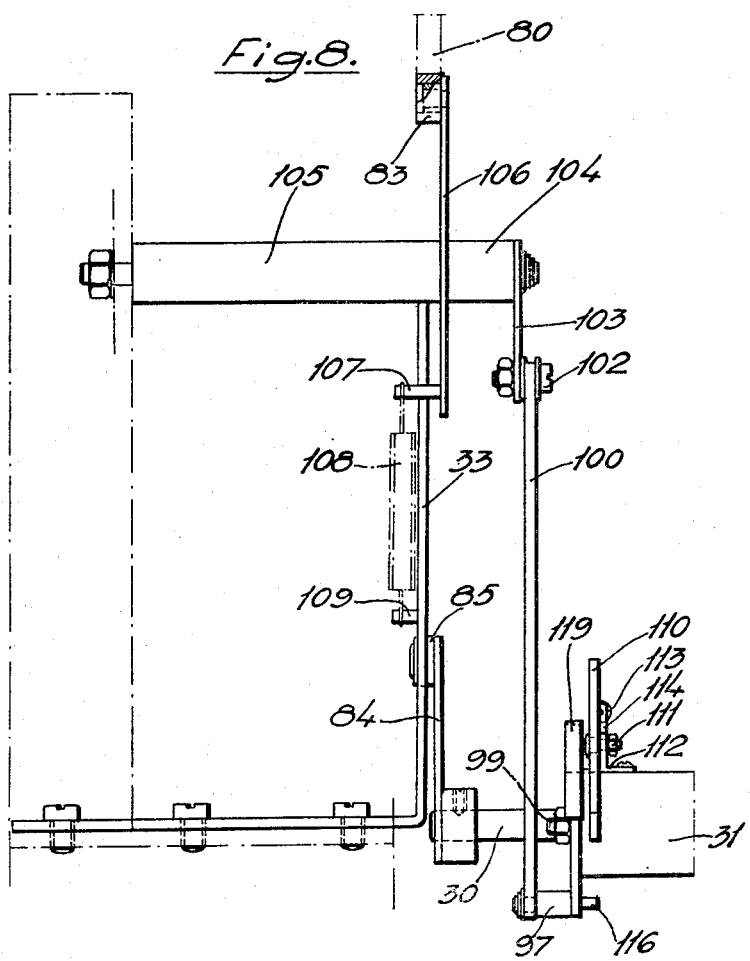

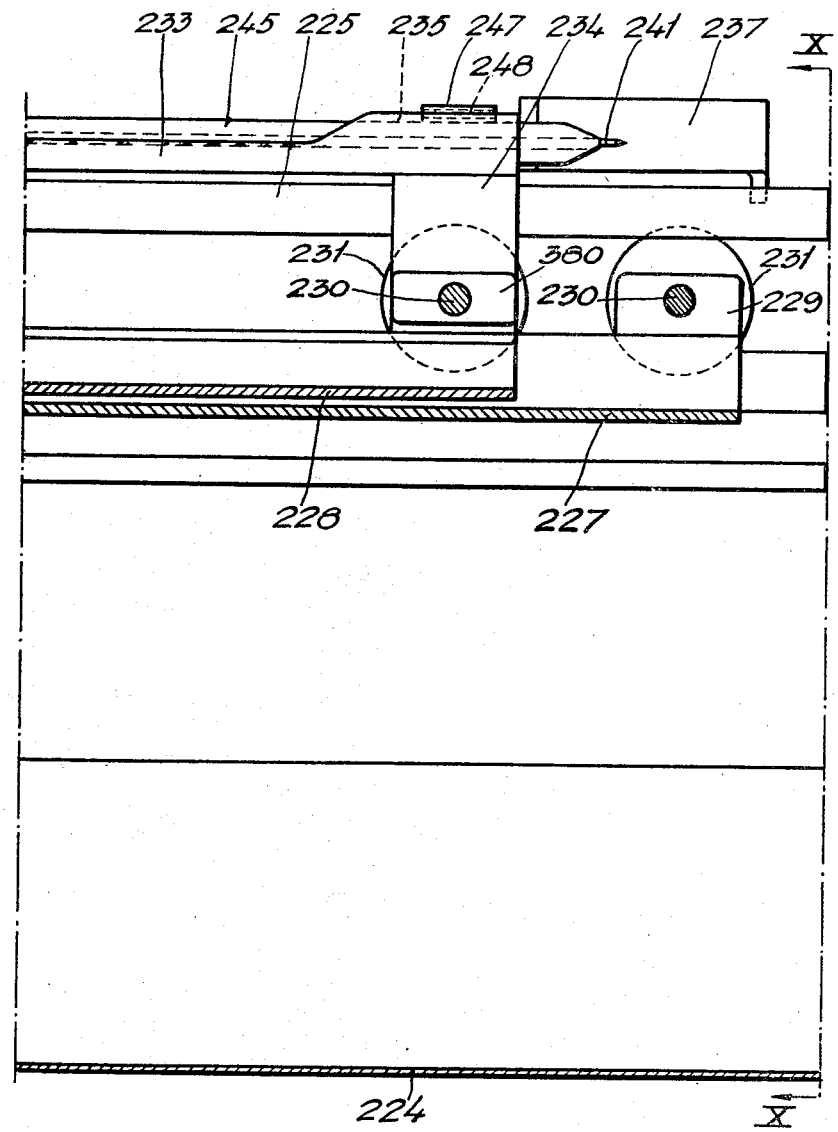

Sept. 28, 1954   C. V. ALLANDER   2,690,146
AUTOMATIC MACHINE FOR STITCHING NECKTIES
Filed Dec. 21, 1949   25 Sheets-Sheet 9

Inventor:
Claës Vilhelm Allander
by his Attorneys,
Darby & Darby

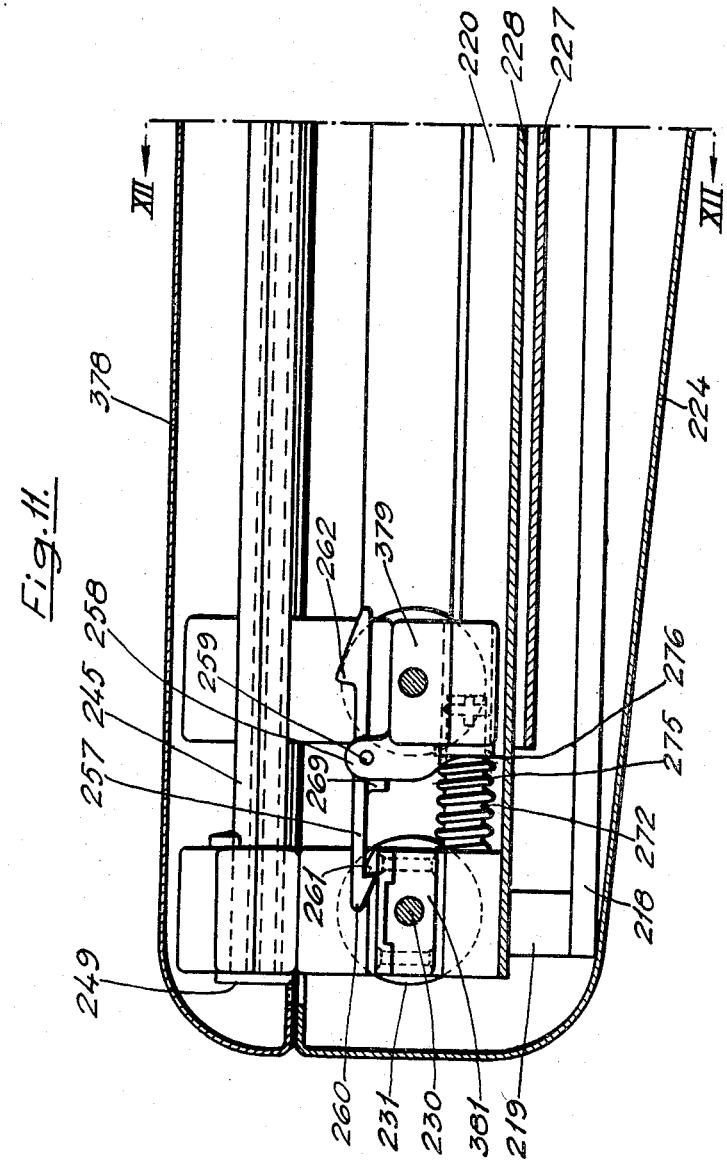

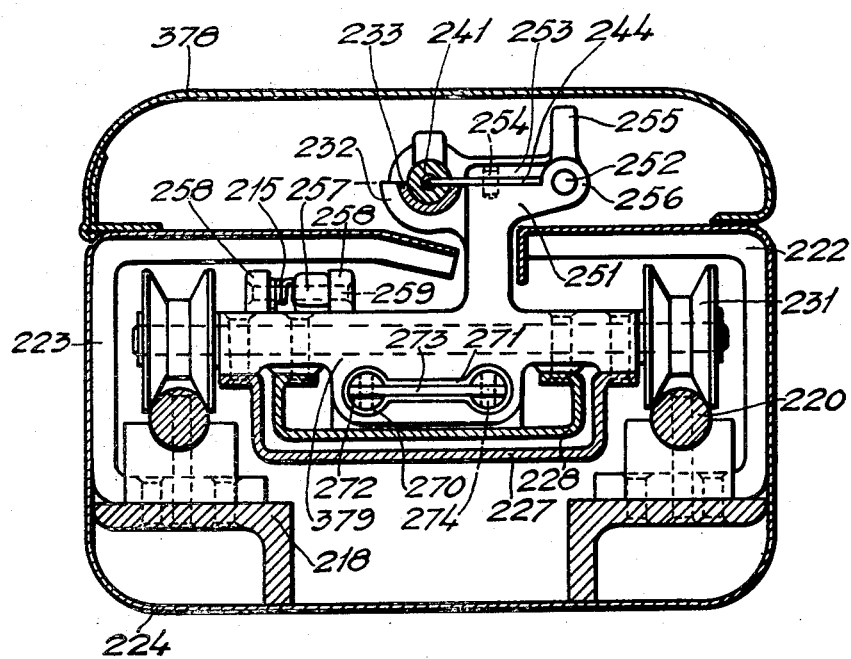

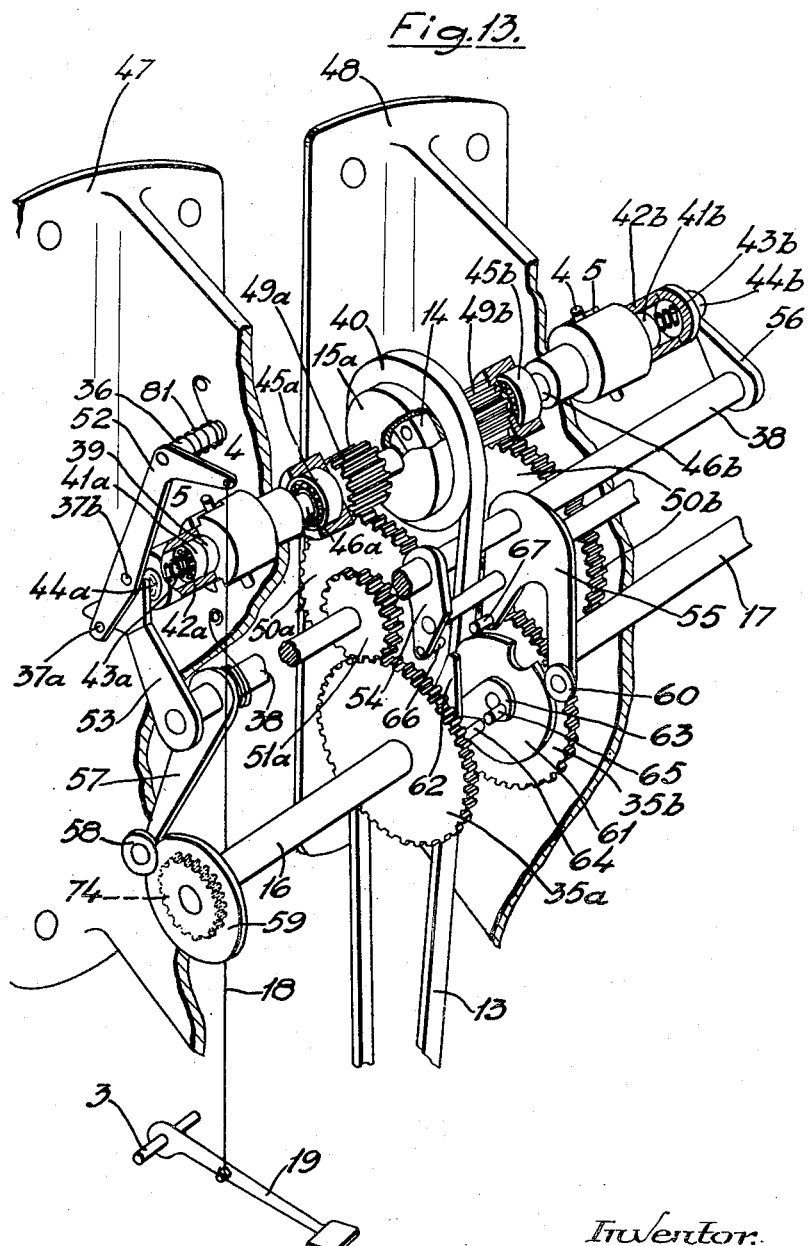

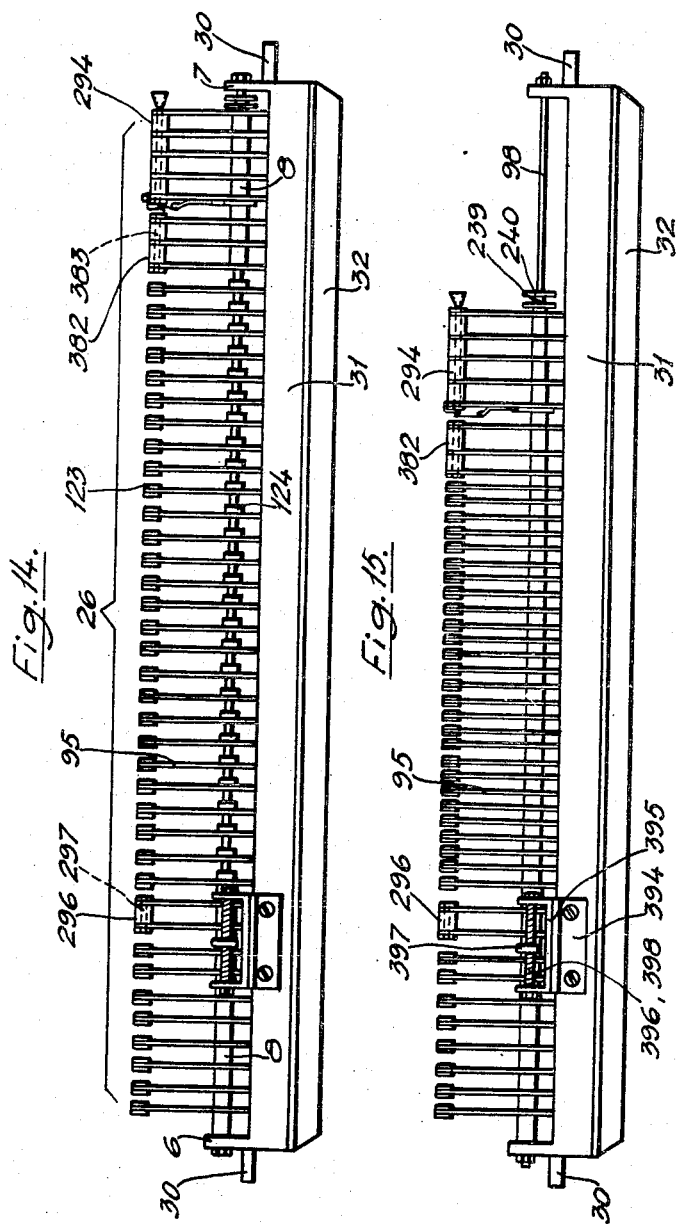

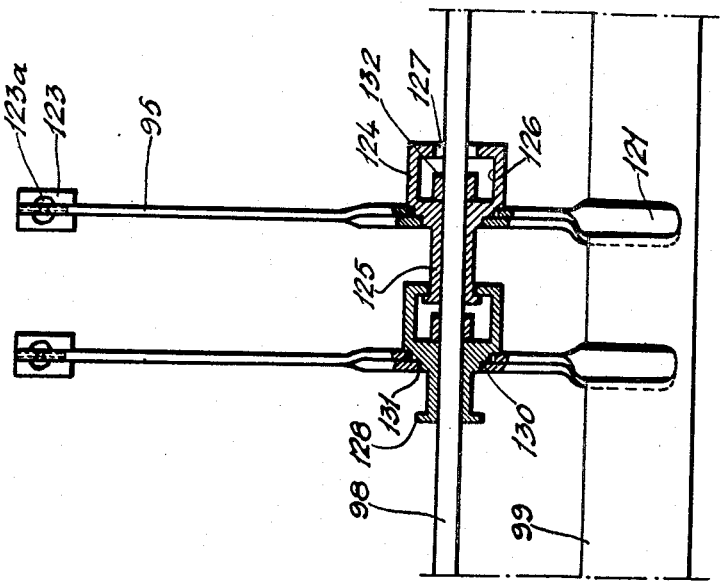
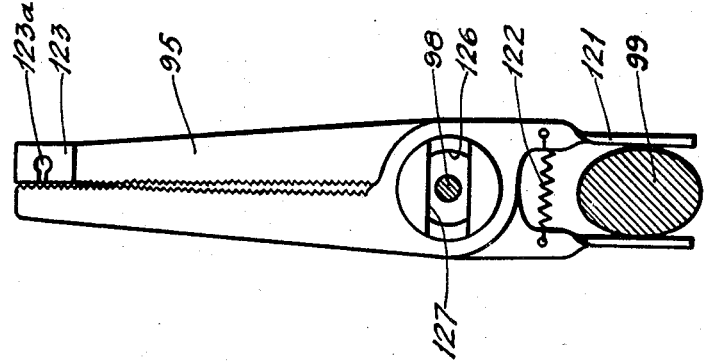

Sept. 28, 1954   C. V. ALLANDER   2,690,146
AUTOMATIC MACHINE FOR STITCHING NECKTIES
Filed Dec. 21, 1949   25 Sheets-Sheet 15
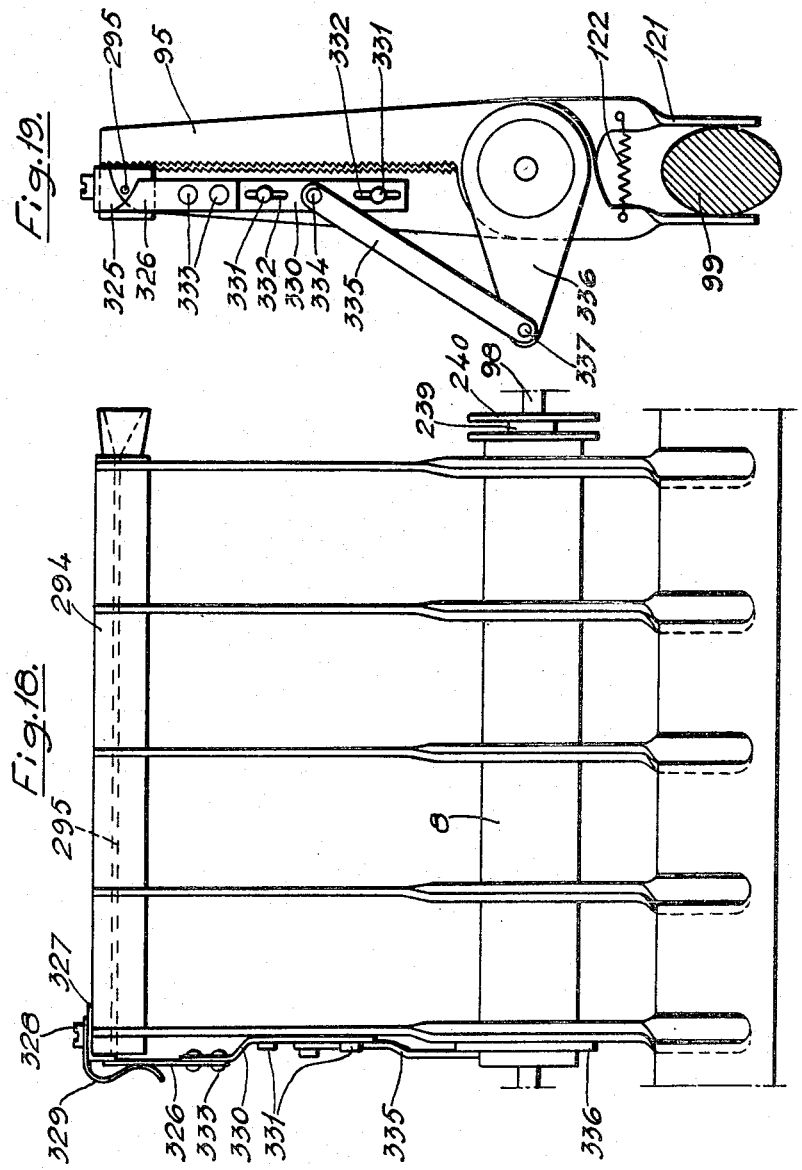
Inventor:
Claës Vilhelm Allander
by his Attorneys,
Darby & Darby Sept. 28, 1954  C. V. ALLANDER  2,690,146
AUTOMATIC MACHINE FOR STITCHING NECKTIES
Filed Dec. 21, 1949  25 Sheets-Sheet 16
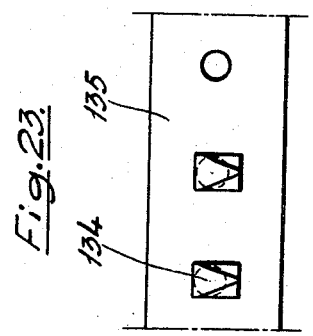
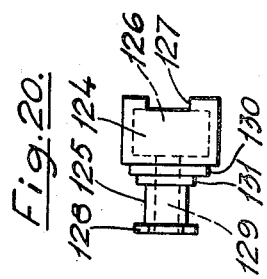
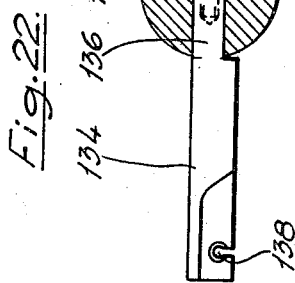
Inventor.
Claës Vilhelm Allander
by his Attorneys,
Darby+Darby

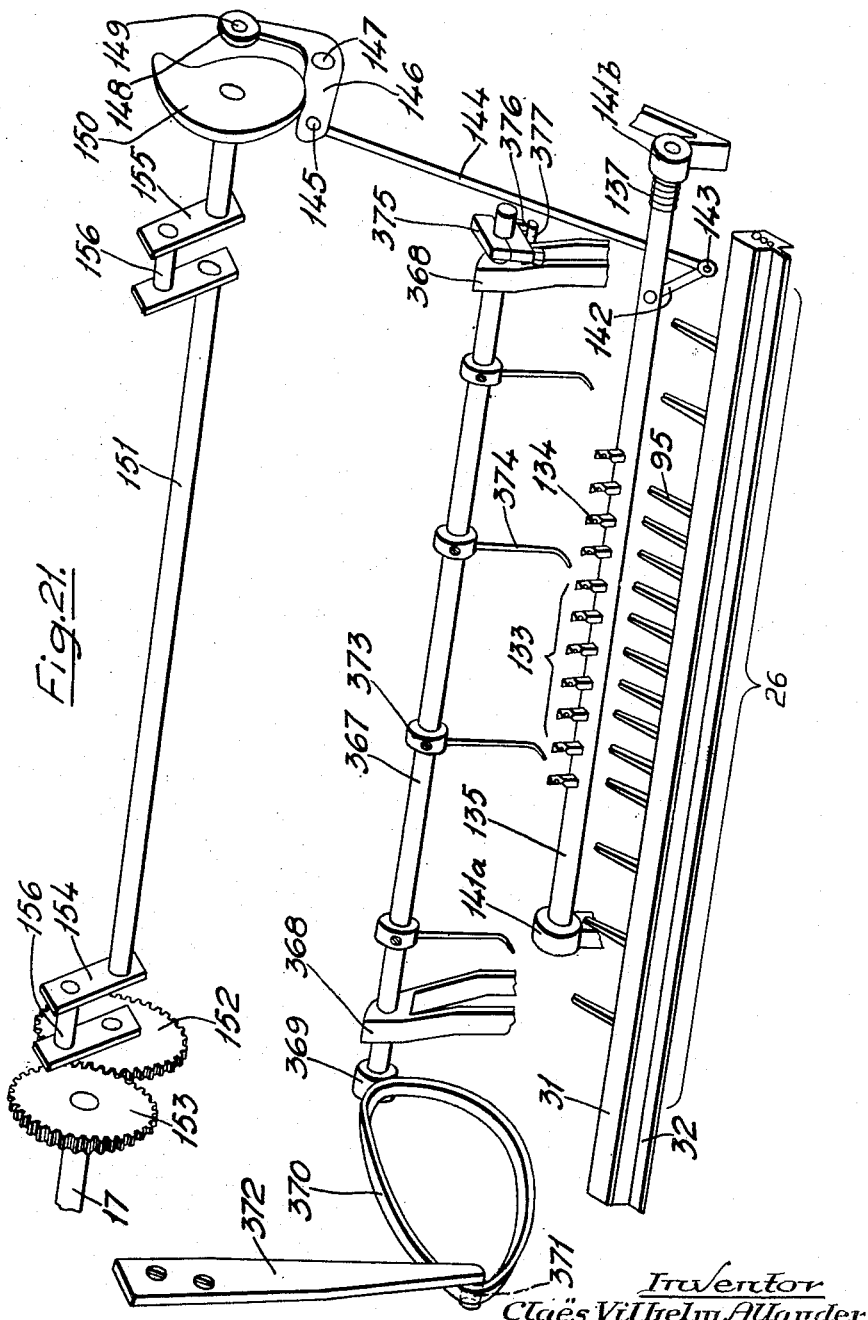

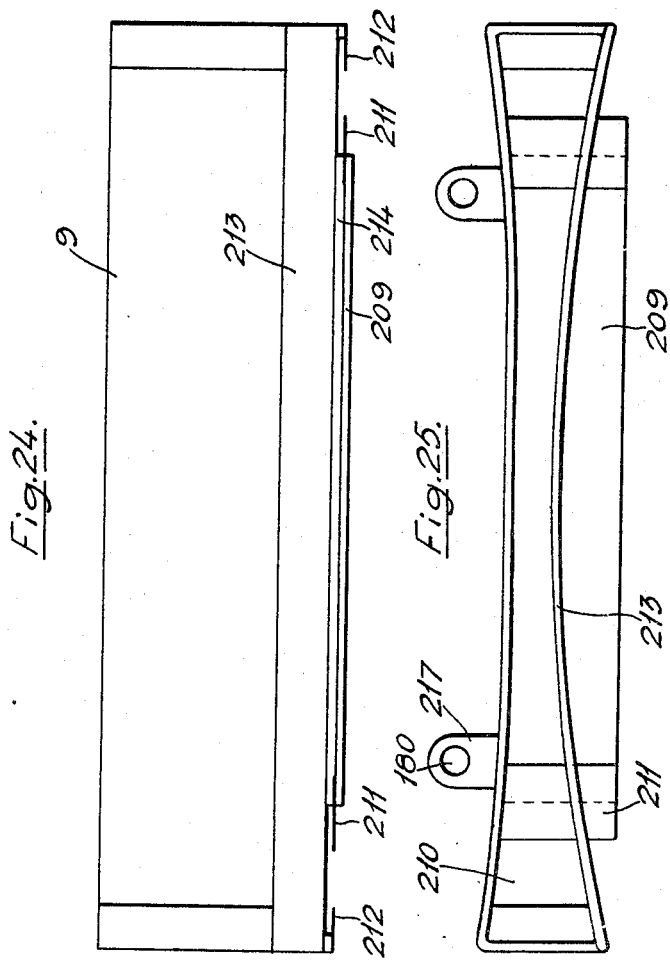

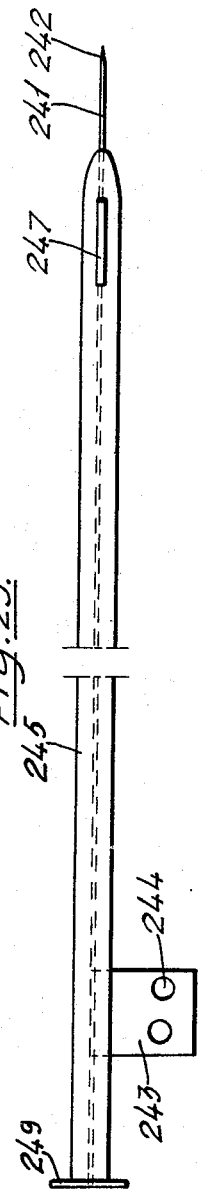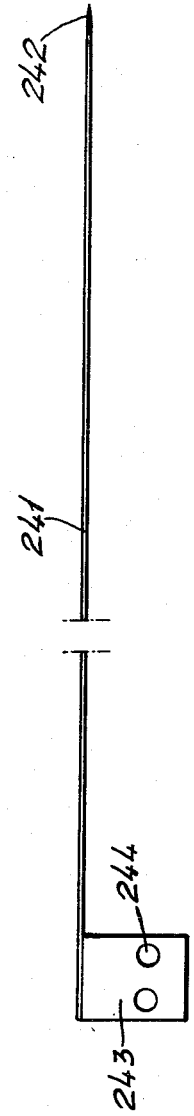

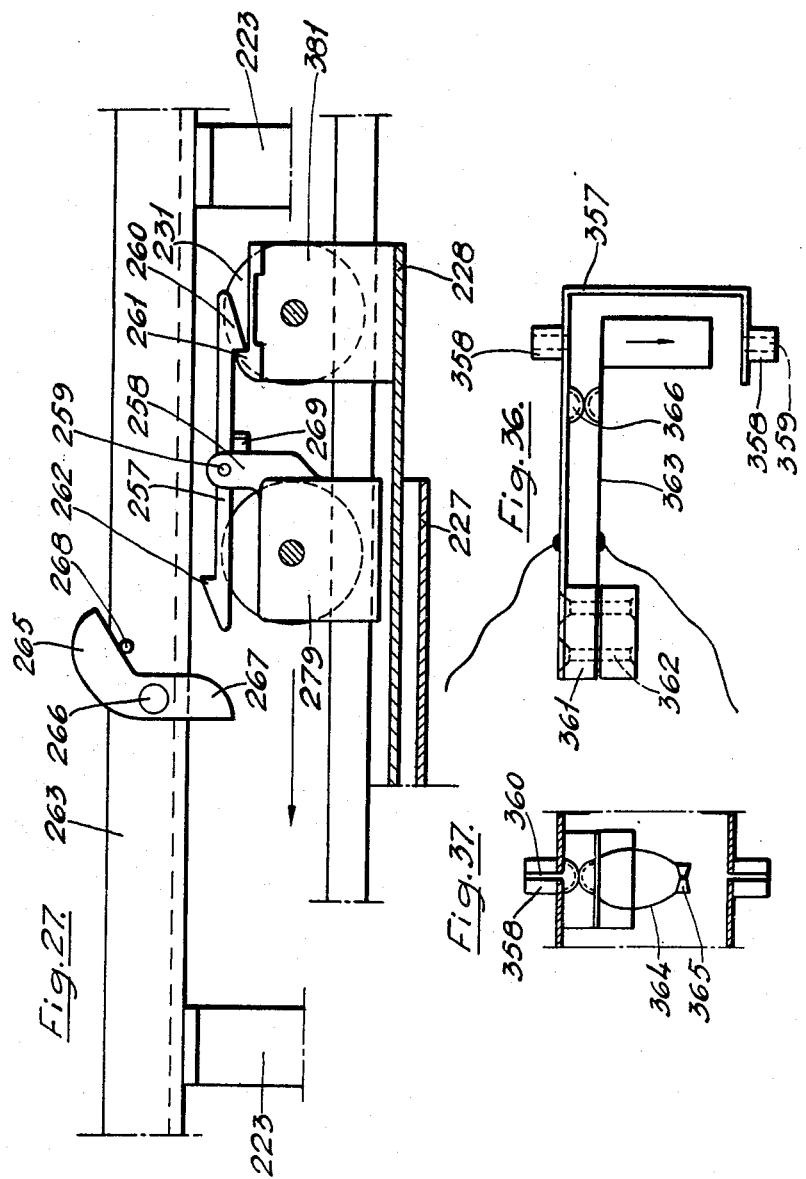

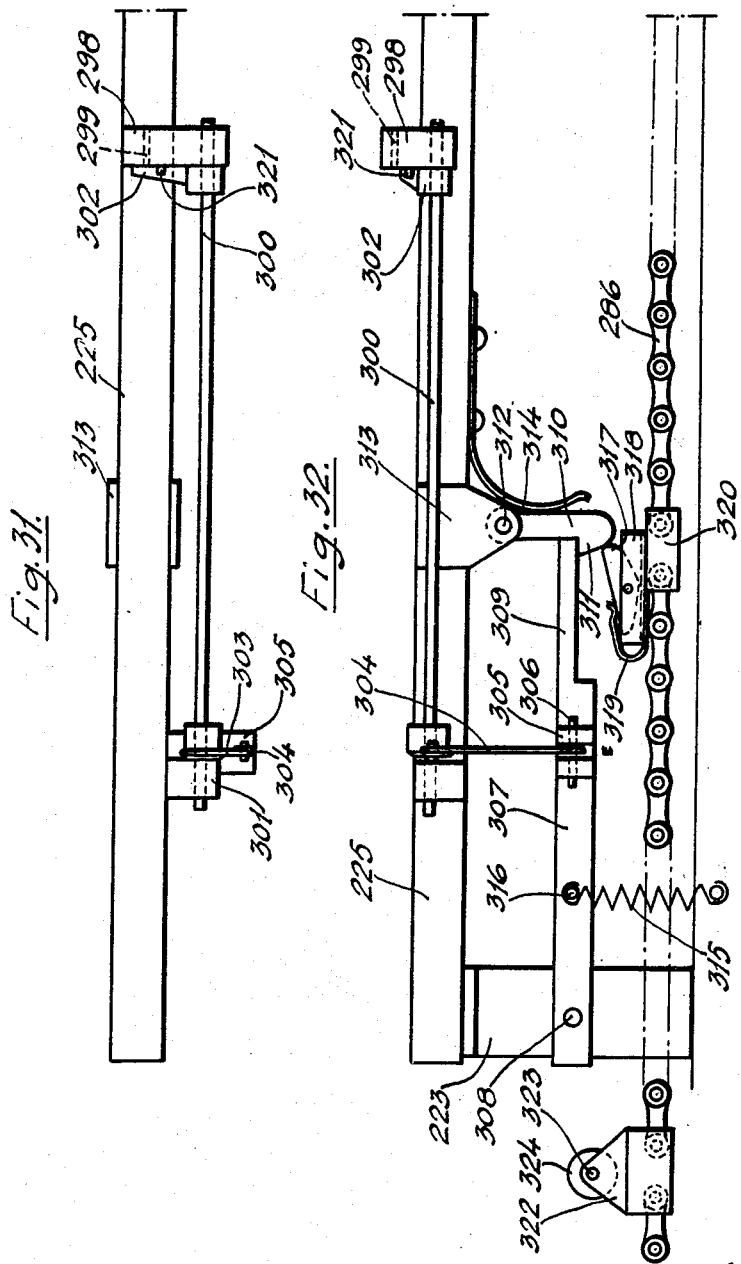

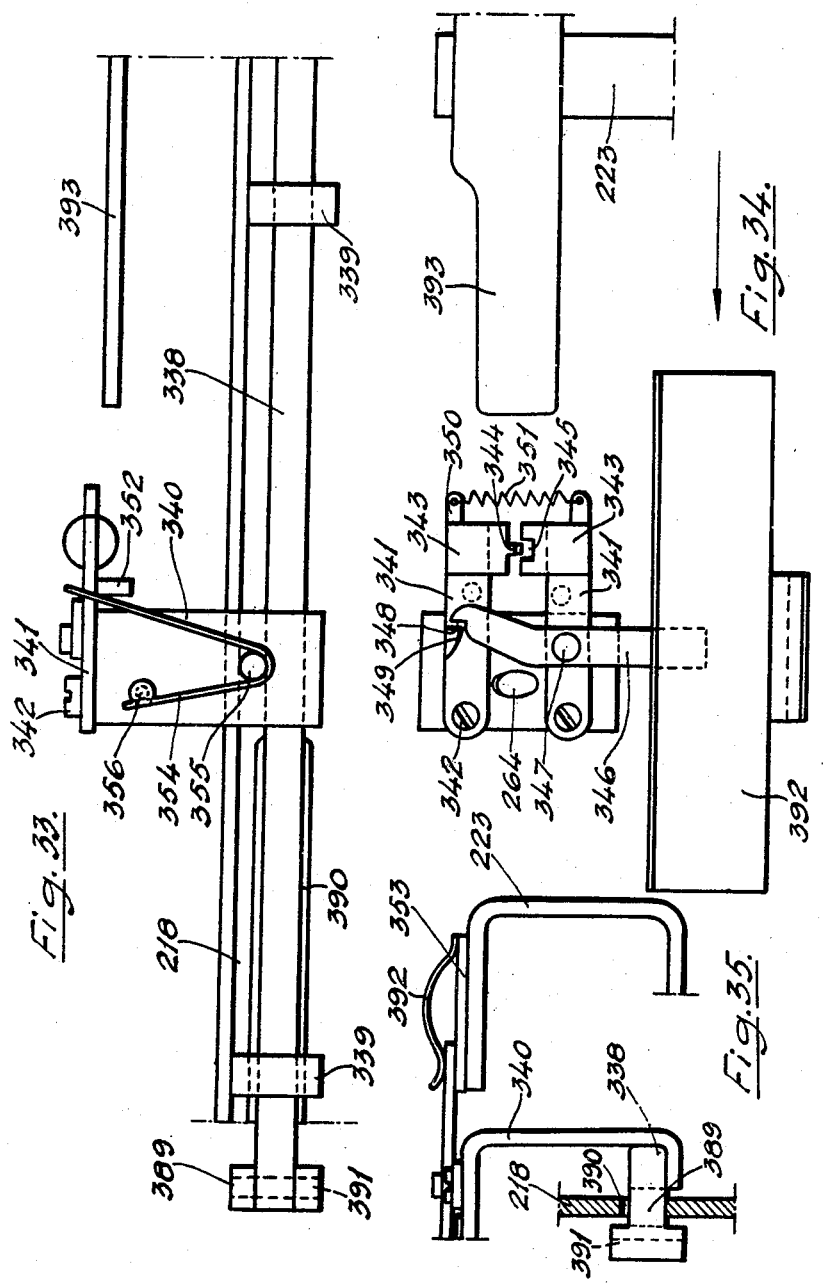

Sept. 28, 1954 C. V. ALLANDER 2,690,146
AUTOMATIC MACHINE FOR STITCHING NECKTIES
Filed Dec. 21, 1949 25 Sheets-Sheet 23
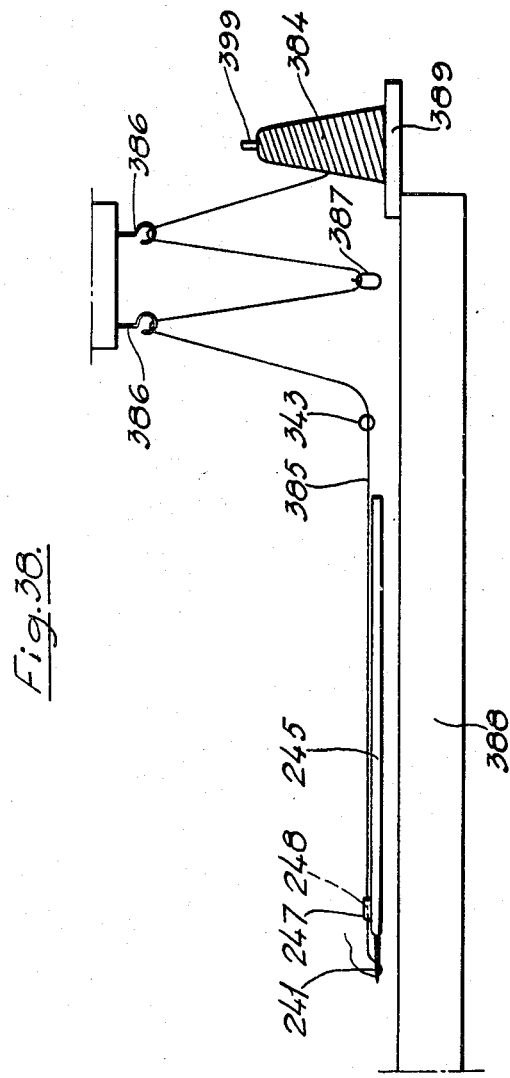
Inventor:
Claës Vilhelm Allander
by his Attorneys,
Darby & Darby Sept. 28, 1954    C. V. ALLANDER    2,690,146
AUTOMATIC MACHINE FOR STITCHING NECKTIES
Filed Dec. 21, 1949    25 Sheets-Sheet 25

INVENTOR:
CLAËS VILHELM ALLANDER
BY: Darby + Darby
ATTORNEYS

Patented Sept. 28, 1954

2,690,146

UNITED STATES PATENT OFFICE 2,690,146

AUTOMATIC MACHINE FOR STITCHING NECKTIES

Claës V. Allander, Johanneshov, Stockholm, Sweden, assignor to Amanda Christensen AB, Stockholm, Sweden Application December 21, 1949, Serial No. 134,233

Claims priority, application Sweden December 22, 1948

16 Claims. (Cl. 112—170)

This invention relates to automatic machines for assembling and stitching together necktie parts, consisting of a tie blank and a lining piece.

An object of the invention is to provide a machine for the purpose stated with much greater production capacity than machines previously known.

Another object of the invention is to provide driving means alternatingly to actuate different working devices of the machine during the operation cycle of same.

A further object is to provide adjustable means for longitudinally folding the tie fabric in such a way that the edges of the folded fabric will be disposed along a straight line irrespectively of the shape of the tie blank.

Another object is to provide such means for handling the tie elements throughout the operational cycle of the machine as not to build up any stresses in the tie fabric.

A further object is to provide means for feeding out and bringing a lining into position along the tie fabric and further means for catching the assembly of tie elements and bringing them into stitching position, said means being adapted to crease the fabrics transversely prior to the stitching thereof.

A still further object is to provide stitching mechanism to perform the stitching operation.

Another object is to provide means for ejecting the stitched tie out of the machine.

Further objects and advantages of the machine according to the invention will be disclosed in the following specification with reference to the appended drawings, in which an embodiment of the machine is illustrated.

In the drawings,

Fig. 5 is a sectional view on the line V—V of Fig. 3;

Fig. 6 is a top plan view of the mechanism shown in Fig. 5;

Fig. 7 is a side elevation of the control mechanism for the pleating device, and Fig. 8 a front view of same;

Fig. 9 is a front view of a part of the stitching mechanism and Fig. 10 a sectional view on the line X—X of Fig. 9;

Fig. 11 is a front view of another part of the stitching mechanism and Fig. 12 is a sectional view on the line XII—XII of Fig. 11;

Fig. 13 is a perspective view of the gear box with certain parts broken away;

Figs. 14 and 15 are front views of the pleating comb with its catching arms in a moved apart and moved together position respectively;

Figs. 16 and 17 illustrate in greater detail the arrangement of the catching arms;

Figs. 18 and 19 are a front view and an end view respectively of the catching device;

Fig. 20 shows a hub of a catching arm;

Fig. 21 is a perspective view of the ejecting device and Figs. 22 and 23 show details of same;

Fig. 24 is a front view of a lining container and Fig. 25 is a plan view of same;

Fig. 26 shows detail for the lining feed device;

Fig. 27 is a front view of the coupling device for the carriages;

Fig. 28 is a side elevation of a needle guiding device with the stitching needle in position, and Fig. 29 is a top plan view thereof;

Fig. 30 is a top plan view of the needle;

Fig. 31 is a top plan view of the gripping device for the thread, and Fig. 32 is a side elevation thereof;

Fig. 33 is a side elevation of the thread squeezing device, and Figs. 34, 35 are respectively a top plan view and an end view partly in section of same;

Fig. 36 is a side elevation of the thread indicating device, and Fig. 37 is a top plan view partly in section thereof;

Fig. 38 is a diagrammatic view of a stretching device for the thread, and

Figure 1:
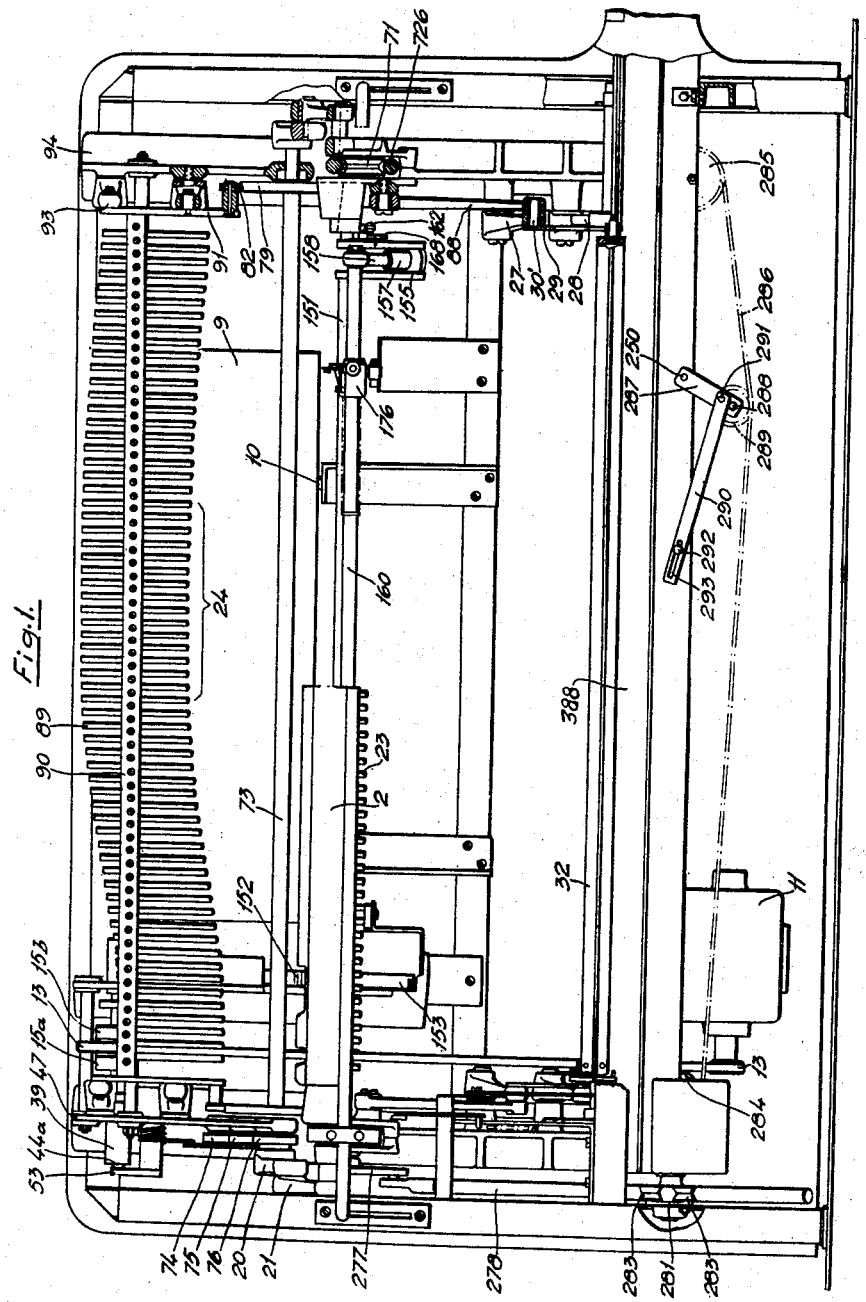
Fig. 1 is a front view of the machine with part of the stitching device broken away.

To make the specification easier reading it has been subdivided into a number of headings under which the different main parts of the machine will be explained in detail. Before that, however, the essential points when stitching a tie will be outlined.

The operator who has the hemmed, sewn together and pressed tie blanks easily accessible for feeding into the machine is sitting facing the machine. The linings have been put into a container 9 (Figure 1) beforehand, said container before beginning the machine operation having been secured into its position by means of bracket means 10 provided in the machine frame. The feeding of linings is automatically performed during operation in a manner described in detail in a later portion of this specification.

The operator starts an electric motor 11 which by means of a V-belt 13 (Fig. 1) drives a conical friction clutch the driving member 14 of which alternatingly acts upon driven members 15a and 15b respectively which after gearing down drive secondary shafts 16 and 17 emerging from the gear box (Fig. 13). These shafts rotate alternatingly one turn at a time subject to the engagement or disengagement of the driven members 15a and 15b which is automatically performed during operation in a manner to be explained later.

Figure 2:
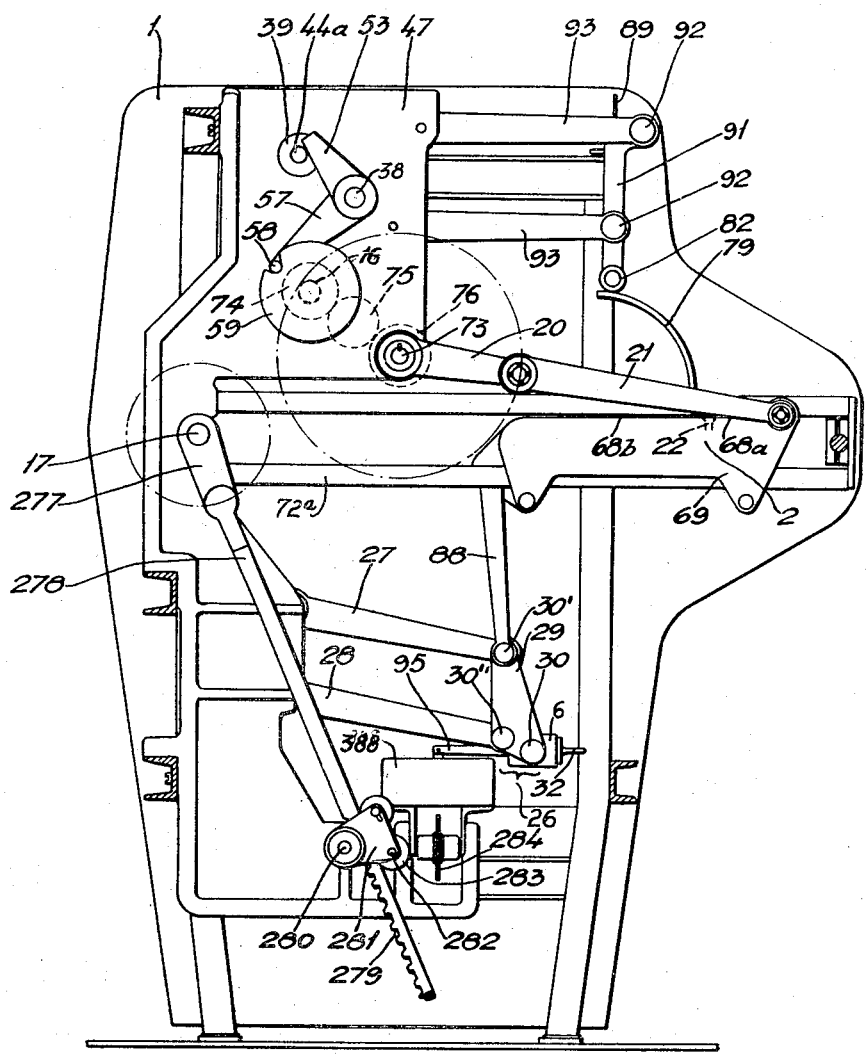
Fig. 2 is a side elevation.
Figure 3:
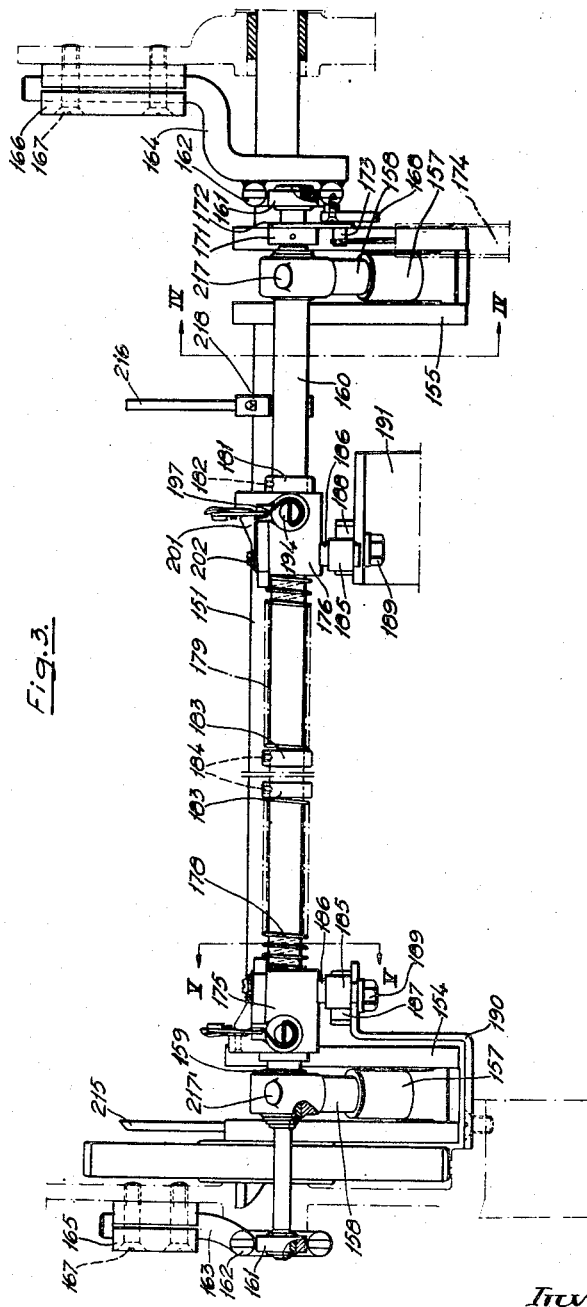
Fig. 3 is a front view of the lining feed mechanism.
Figure 4:
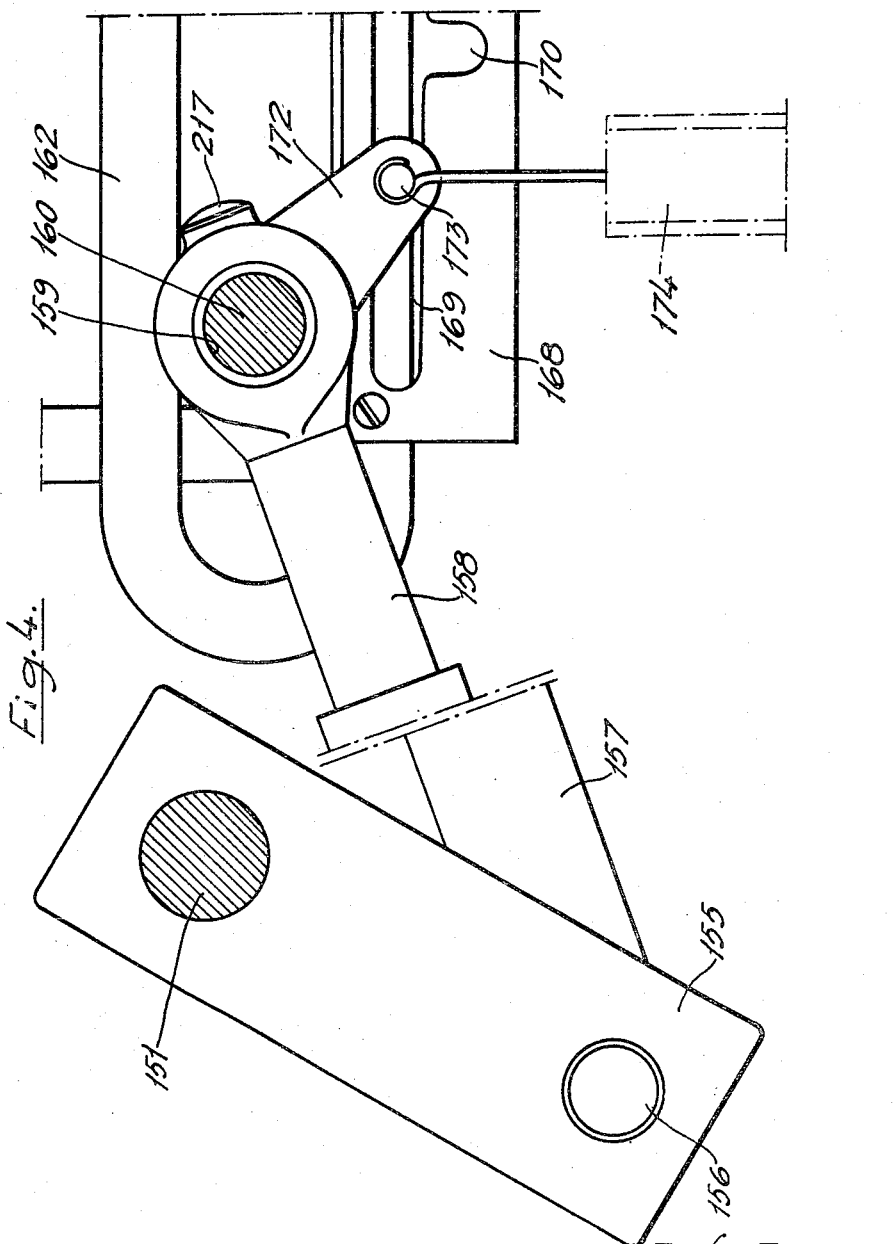
Fig. 4 is a sectional view on the line IV—IV of Fig. 3.
Figure 10:
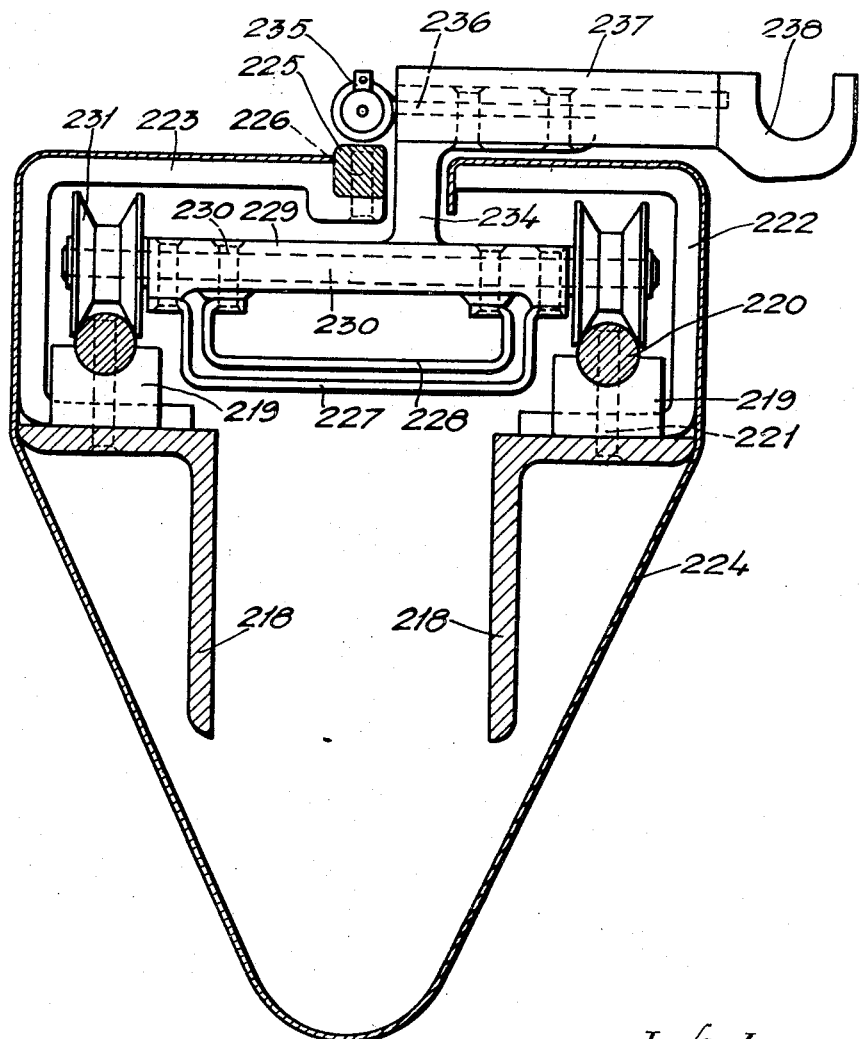

One full revolution of one secondary shaft and a consecutive full revolution of the other together correspond to the operating cycle of the machine. The operator adjusts the tie blank to fit into detachable templates (not shown) on the work table 2 (Fig. 1) whereafter the shaft 16 is started to rotate by actuating a pedal 19 connected to the friction clutch 14, 15 (Fig. 13). When rotating, shaft 16 drives the clutch by means of gears 74, 75 and 76. The gear 76 is fixed to a shaft 73, provided with a couple of crank arms 20 (Figs. 1, 2). The latter are arranged to actuate driving rods 21 at their other ends pivoted to the table 2 which is consequently urged to move transversely in a horizontal plane. The initial position of the table is its end position closest to the operator, and the table will consequently on starting its movement travel away from the operator. Dependant on this displacement a curve-shaped folding device will be actuated to move down against the table in a manner to be explained in greater detail further on; said folding device feeds the tie fabric through a longitudinal slot 22 in the table 2, the tie fabric being thus folded about its longitudinal axis of symmetry, and so that it will be turned inside out.

Depending from the bottom face of the table 2 leaf springs 23 are provided at both sides of the slot 22 along the whole length of the slot. These springs engage each other in pairs and serve to maintain engagement of the fabric with the curve-shaped folding device 24 and thus prevent unintentional displacement of the fabric and to retain the tie blank in its position for the following operation.

During its travel away from the operator the table will engage the lining feed device, which during the latter part of the proceeding operating cycle has caught a new lining from the lining container 9. The lining will be brought to rest against the springs 23 alongside the tie blank retained between the springs.

After this a pleating comb 26 which is advancing from below will begin to close about the tie assembly but will not as yet touch the latter. During the earlier part of its subsequent movements it travels substantially in a vertical direction with a horizontal component of velocity essentially corresponding to the transverse velocity of the table.

In the farther end position of the table the pleating comb after having up till then been open and not touching the fabric will be actuated to clap together like scissors about the fabric which thus will be securely held. The pleating comb now takes over the transport of the fabric, and keeps it engaged until brought into the stitching position and stitched whereafter it is released prior to being ejected by the ejecting device. The table will actuate the transport movement of the pleating comb when traveling back to its initial position. During an earlier part of this movement the pleating comb 26 is disposed vertically, but at a later phase of the movement it will be turned in such a way that in its nethermost position, which corresponds to the rest position of the table closest to the operator on completing half the operational cycle, the comb is disposed horizontally and facing away from the operator.

When now the secondary shaft 16 has completed its revolution the shaft 17 immediately begins to rotate. This shaft in addition to driving the stitching device also actuates the squeezing comb and the lining feed mechanism.

Prior to the stitching operation the horizontally disposed fabric which is held by the pleating comb 26 is pleated in that the several elements of the pleating comb are brought closer to each other in the longitudinal direction of the comb the fabric being thus arranged in uniform pleats. The squeezing comb then moves down in between the elements of the pleating comb and against the fabric. The elements of the pleating comb as well as those of the squeezing comb are notched the notches serving to guide the needle which will subsequently be actuated to pierce the fabric in one single operation.

During the return travel of the needle the thread is retained by a special catching device and is thereafter cut by a shearing device in dependance of the raising of the pleating comb.

The now so far finished product is removed from the machine by means of an ejecting device which operates in dependance on the travel of the table 2 and is driven from a stud or roller member 371 fixed to an arm 372 depending from under the table (Fig. 21). Said member directly actuates an eye-shaped curve member 370 secured to a horizontal shaft 367 provided with a plurality of radially extending ejecting arms 374. The curve 370 is so shaped that the actuating member 371 imparts to the ejecting arms such a movement as to bring them during the travel of the pleating comb 26 to move in from below and eject the manufactured product out of the machine with an adequate velocity.

The mechanisms and devices of the machine and their functioning will now be more comprehensively described.

*The gear box*

The gear box (see Fig. 13) which is secured to the upper part of the machine frame and comprises two end pieces 47 and 48 is provided with a primary shaft 39 arranged to be driven from a V-belt pulley 40 which is operatively connected to an electric motor 11 disposed at the base of the machine frame and connected to the pulley by means of a V-belt.

The pulley 40 is integral with or firmly secured to the driving member 14 of a double-sided conical friction clutch which is arranged alternatingly to coact with driven clutch members 15a and 15b respectively.

The primary shaft 39 is journalled at both ends in ball bearings 41a and 41b which are secured in axially displaceable sleeves 42a and 42b which enclose coil springs 43a and 43b acting against balls 44a and 44b which are disposed at the outer extreme end of each sleeve so as to partially protrude from the ends of the sleeves.

The driven members 15a and 15b of the conical friction clutch are journalled on ball bearings 45a and 45b the inner races of which are secured to sleeves 46a and 46b those in their turn located in the end pieces 47 and 48 and the outwardly facing ends of which have a larger diameter and are provided with axially disposed borings in which sleeves 42a and 42b are axially displaceable. Rotation of the sleeves is prevented by pins 4 extending radially from the periphery of sleeves 42a and 42b and engaging axial slots 5 in sleeves 46a and 46b. The clutch members 15a and 15b are integral with or rigidly secured to gears 49a and 49b which gears are arranged to drive secondary shafts 16 and 17 emerging from the gear box by means of intermediate gears 50a, 50b and 51a, 51b in such a manner that the shaft 16 will first complete one revolution and shaft 17 immediately after that will in its order complete one revolution.

At the end piece 47 a bell crank 52 is fulcrumed by means of a stationary stud 36 and is at one end provided with two pins 37a and 37b extending towards the end of shaft 39. The bell crank 52 is arranged to coact with the free end of an arm 53 by means of studs 37a and 37b the latter arm being secured to the end of a shaft 38 to which four further arms 54, 55, 56 and 57 are secured. The other end of the bell crank 52 is connected to a pedal 19 by means of a wire or cable 18. The pedal 19 is pivoted in the frame structure by means of a shaft 3 and serves to actuate the bell crank 52. A torsion spring 81 around the stud 36 urges the crank 52 to rock counter-clockwise.

When actuating the pedal 19 the bell crank 52 is swung clockwise the pin 37a consequently sliding along the flank of the arm 53 which thus will be swung clockwise and push back the ball 44a and the sleeve 42a whereby shaft 39 will be axially displaced the clutch member 15a thus being engaged. The shaft 16 will then begin to rotate by means of the gear connection 49a—50a—51a—35a.

A roller 58 rotatably disposed on the arm 57 will on rocking of the arm 53 be raised out of a recess in the periphery of a circular disc 59 secured to the shaft 16 and thus leave shaft 16 free to rotate. When the periphery of disc 59 moves along the roller 58 the arm 57 and its shaft 38 cannot be swung back until the recess in the periphery of disc 59 will again face the roller 58. This serves to prevent the shaft 17 from rotating simultaneously with the shaft 16 as a similar roller 60 rotatably disposed on the arm 55 is during rotation of shaft 16 engaging a recess in a circular disc 61 secured to shaft 17.

Arms 62 and 63 are mounted on shafts 16 and 17 in such a manner that they have a limited freedom of rocking in relation to the respective shafts. The arms 62 and 63 are provided with each a projection 64 and 65. When shaft 60 has almost completed a revolution the arm 62 actuates a roller 66 disposed on the arm 54 which will result in the roller 60 being raised out of the recess in the disc 61 while the roller 58 simultaneously locks the discs 59, and thus prevents shaft 16 from rotating during the rotation of shaft 17. The arm 56 at the same time depresses the ball 44b, and the arm 53 moves away and causes the ball 44a to be pushed out by its actuating spring whereby the clutch member 15b will be put into engagement.

The next time this shifting is to take place the arm 62 must be swung a little in its rotational direction in order not to be disposed opposite the roller 66, and thus obstruct the movement of the arm 54. This is brought about by the projection 65 at the moment of shifting over between shafts 16 and 17 actuating the stationary projection 64, and thus the arm 62 whereby shifting over can take place without obstacles. When shifting over from shaft 16 to shaft 17 similar conditions prevail, and the projection 64 will then at the moment of shifting over via projection 65 actuate the arm 63 this enabling the arm 55 with roller 67 to be rotated.

The work table

The work table 2 (see Figs. 1 and 2) comprises two longitudinally extending flat members 68a and 68b mounted some small distance apart to form a slot 22 for the tie fabric therebetween end pieces 69 and 70 being provided to constitute a rigid assembly together with the members 68a and 68b. The end pieces are provided with rollers 71 arranged to move along tracks 72a and 72b mounted on the machine frame. For its reciprocating movement the table is connected to pivoted driving rods 21 which are pivotally connected to cranks 20 secured to a shaft 73. The latter is driven from shaft 16 by means of gears 74, 75 and 76. The end piece 69 is provided with an arm 372 carrying a roller 371 actuating the ejecting device for the manufactured tie (Fig. 21).

The end pieces 69 and 70 are each provided with a curve-shaped rolling track 79 serving to guide rollers 82 carried by the folding device for the tie fabric. The end piece 69 has another rolling track 80 actuating the opening and closing of the pleating device by means of a roller 83 and mechanism coacting therewith.

The members 68a and 68b of the table are provided at the bottom with the leaf springs 23 previously mentioned, and which are located along and close to the slot 22.

At the inner faces of the end pieces 69 and 70 arms 88 are pivotally attached serving to actuate the pleating device to fetch the fabric previously folded in the folding device together with the lining, and move the assembly to the position for the stitching operation.

The work table can be provided with exchangeable templates having the contours of the tie patterns, or can be provided with a special automatic device (not shown) for feeding in the tie blanks.

The folding device

The folding device (see Figs. 1 and 2) for the tie proper mainly consists of flat teeth or ribs 89 supported by a structural member 90 and displaceable longitudinally. The teeth thus can be individually so adjusted that the contour described by their free ends will be curve-shapen in such a manner that the tie fabric at different points along its length is fed down to different depths according to the width of the tie fabric in each point which will cause the adjacent outer edges of the folded tie blank being stitched together to be disposed along a straight line. The proper adjustment of this curve is most important for the manufacture of a perfect tie. This curve is different for various kinds of fabric and different dimensions, and even if a rough estimate of the suitable shape of the curve can be obtained by adjusting it essentially proportionally to the width of the tie fabric at each point the final shape must be found out by trial and error. The importance of the teeth 89 being longitudinally adjustable consequently is easily appreciated.

The structural member 90 is supported by end pieces 91 having studs 92 with rollers 82 arranged for rotation thereon. The studs are secured to arms 93 the other ends of which are pivoted to the end pieces 47 and 94 of the machine frame. The rollers 82 engage the tracks 79 on the table.

On the reciprocating movement of the table the folding device alternatingly will move up and down, and will further have a horizontal component of velocity corresponding to the transverse velocity of the table. When going down the folding device will urge the tie blank down through the slot 22 in the table and consequently fold it longitudinally the folded tie blank being engaged by the springs 23, and on withdrawing of the folding device will be retained between those. The springs 23 are preferably so disposed that they fill in the gaps between the teeth 89 in the folding device, and will hold the fabric so as to build up no stresses therein.

The pleating device

The pleating device (see Figs. 2, 14, 15 and 21) for the tie fabric comprises a pleating comb 26 constructed as follows: A channel-shaped bar 31 the ends of which are closed by end pieces 6 and 7 is suspended by means of journals 30 between link plates 29 which by means of studs 30' and 30'' are controlled by arms 27 and 28 the other ends which are pivoted to the main structure, and which are moreover by means of arms 88 connected to the table on the reciprocating movement of which the bar 31 is displaced parallel to itself in a horizontal as well as a vertical direction. Between the end pieces 6 and 7 a cylindrical rod 98 is fixed, and another rod 99 with an oval shaped cross section is rotatably mounted therebetween as shown in Figures 18 and 19. A number of catching arms 95 are pivoted on the rod 98 and are arranged to close about the tie fabric in pairs with their free extending members while their members 121 facing the web of the bar by means of tension springs 122 attached to the members are brought to engage the rod 99. Opening and closing the members is brought about by turning the rod 99 which for this purpose is controlled by a device to be described later.

The bar 31 is reinforced by means of a T-shaped beam 32 attached to the web of bar 31.

On displacement of the bar 31 corresponding to movement of the table 2 a rotation of the bar about the journals 30 simultaneously takes place, and the bar in its uppermost position is so disposed that the catching arms 95 are in an upright position while in its lowest position it has been rotated by 90° the catching arms thus extending in a horizontal plane and facing away from the operator. This is brought about by means of the following arrangement (see Figs. 7 and 8):

To the machine frame is near one end of the bar 31 attached a vertically disposed plate 33 provided with a curve-shaped slot 34. An arm 84 is secured to the journal 30 which is rigidly fixed to the end piece of bar 31, and onto the free end of the arm 84 is mounted a roller 85 engaging the slot 34. The latter is disposed in such a way that on displacement of the bar 31 parallel to itself the arm 84 will turn the bar by 90° when the table performs its reciprocating movement between its end positions.

The rod 99 having an oval cross section is journalled in the end pieces of bar 31 by means of cylindrical studs. One of those studs has an arm 96 rigidly mounted thereto outside the end piece, and the free end of that arm is by means of a pin 97 connected to an arm 100 the upper end of which is provided with a slot 101 of elongated shape engaged by a pin 102 displaceable within that slot, and attached to the end of an arm 103 which by means of a hub 104 is pivotable about a shaft 105 rigidly mounted in the machine frame. The movement of the arm 96 is limited in one direction by a lug 113 in the end piece. To the hub 104 is rigidly secured a two-armed lever 106 at its upper end provided with a roller 83 arranged to coact with a track 80 provided on the end piece 69 of the table. The other end of the lever 106 carries a pin 107 connected by means of a tension spring 108 to a pin 109 secured to the plate 33.

When the table 2 is travelling in the direction of the arrow 117 (see Fig. 7) the track 80 will actuate the roller 83 and thus rock the arm 106 counter-clockwise this causing the arm 103 to raise the arm 100 by means of its projection 102 and consequently swing the arm 96 counter-clockwise. The shaft 99 is thereby actuated to open the arms 95. In order to keep the arm assembly in a position corresponding to the arms 95 retaining their open position during the travel of the bar 31 to its uppermost position a catch 110 is provided mounted by means of a pin 111 to a plate 112 secured to one side of the bar 31. The catch 110 at its lower end has a projection 110a and is urged into engagement with a stop pin 115 in plate 112 by means of a tension spring 113 one end of which is attached to the upper part of the catch, and the other end of which is attached to a projection 114 in the plate 112. When the arm 100 is pulled upwards as previously described an extension 116 of the pin 97 will be caught by the projection 110a on the catch 110, and will be retained in this position.

The arms 95 now are kept open, and the elongated slot 101 makes it possible for the arm 100 to move freely on the upward travel of the bar 31. When the table is approaching its near end position, and the bar 31 simultaneously is close to the end of its upward travel a stop 120 depending from the end piece 69 of the table by means of a vertically disposed projection 120a will engage the free end of the catch 110 on the rear side thereof. The catch 110 in that moment is essentially horizontal, and on engagement with the stop 120 it is released from its engagement with the pin 116. A leaf spring 119 which in that position is contacting the flank of the arm 96, and is secured to one side of the bar 31 by means of screws 121 will urge the arm 96 to rock, and consequently to turn the rod 99 this turning of the rod being completed by means of the spring tension between the inwardly facing shanks of the arms 95 which causes the latter to clap together about the tie fabric and the lining. If springs 119 were not provided it might happen that the acting spring tension between the arms would not be sufficient to rotate the rod 99 because the latter could possibly be so disposed that no torque could be exerted upon it. When the table travels back to its far end position the tie elements are carried by the arms 95 and the pleating device down to their lowest position corresponding to the table resting at its far end position. The bar 31 and consequently the arms 95 have during this moment described an arc of 90° leaving the arms in a horizontal position ready for the stitching operation.

Before beginning the stitching operation the tie fabric must, however, be pleated into transversal creases, and a special squeezing comb should be brought down to contact the tie fabric and guide the needle together with the pleating comb. Before describing the stitching operation the arrangement of the pleating comb and the squeezing comb will be disclosed.

The structural member of the pleating comb 26 consists of the channel-shaped bar 31 in the both end pieces 6 and 7 of which are supported the rods 98 and 99 (see Figs. 14, 15, 16, 17 and 20).

Sleeves 124 with axially disposed borings 129 are slipped over the rod 98, and are pivotally and axially displaceably disposed around the latter. The sleeves 124 are at their thicker ends recessed as at 126 and are transversely slotted as at 127 segmentally shaped edges thus being left. At the other smaller end of the sleeve is provided a flange 128 the diameter of which is slightly less than the diameter of the recess 126. The flange 128 is at two diametrically opposed points cut away level with the smaller diameter 125. The flange 128 of one sleeve can be introduced into the recess 126 of the adjacent sleeve and after turning the sleeves by 90° relatively to each other the flange 128 will abut the segmentally shaped edges outside the recess 126 and prevent separating the sleeves. By providing spacers 132 the distance between the sleeves when pushed together can be accurately adjusted.

The arms 95 are pivoted on shoulders 130 and 131 on the sleeves 124 the inner one having a running fit and the outer one being rigidly secured. The arms terminate with shanks 121 which are brought to contact with the oval rod 99 by means of tension springs 122 connecting the shanks the rod 99 and springs 122 thus controlling the opening and closing of arms 95.

In each pair of arms 95 that arm which in the lowest position of the pleating comb will be the nethermost has a guide wedge 123 secured to its free end. Each wedge is notched as at 123a for the passage of the needle. The arms have indentations in their facing edges to hold the tie fabric more securely.

Close to both ends of the bar 31 arms of substantially the same design are disposed. The arrangement of the supporting sleeves is however slightly different because those latter arms do not need to be pushed together or be separated. There is no need for pleating the tie fabric transversely over the whole of its length because it is not stitched together near its ends. Those latter arms are supported by plain cylindrical sleeves 8 the distance between the arms being constant.

During the whole handling by means of the pleating comb of the tie proper and the lining up to the stitching operation the tie elements are held flat between the arms 95, i. e. the sleeves 124 are spaced as far apart as possible. To stitch the tie which is done in the lowest horizontal position of the pleating comb the fabric must be creased which is performed thereby that the arms supported by the sleeves 124 by means of a mechanism, later to be described in connection with the stitching mechanism will be pushed together as much as possible this causing the fabric firmly held between the arms 95 to be arranged into transversal folds.

Between the arms 95 when brought close together a squeeze comb 133 is swung down (see Figs. 21, 22 and 23). This comb comprises teeth 134 parallelly disposed in recesses in a shaft 135 perpendicularly to the latter, and uniformly spaced apart at distances which correspond to the distances between the arms 95 when those are brought close together. At their outer ends the teeth 134 have triangular cross section, and are shaped with such dimensions that they fit in between the guiding wedges 123 at the ends of the arms 95 with a certain clearance necessary for the tie fabric when the squeeze comb has been brought down to its horizontal position. Near the ends of the teeth recesses as at 138 are provided which correspond to the notches 123a in the guiding wedges 123 and serve additionally to guide the needle. The other ends of the teeth 134 are machined to provide shanks 136 which fit accurately into corresponding bores in the shaft 135, and are secured by means of screws 139 engaging threaded holes 140 in the ends of the shanks.

The shaft 135 is rockably journalled in bearings 141a and 141b supported by the frame. Close to one end of the shaft a transversally extending arm 142 is rigidly secured by means of a pin 143 pivotally connected to a link 144 the other end of which is by means of a pin 145 pivotally connected to a bell crank 146 by means of a pin 147 supported by the frame. At the other end of the bell crank 146 a roller 148 is rotatably supported by a pin 149 the roller being arranged to coact with a cam disc 150 secured to one end of a shaft 151 rotatably supported by the end pieces of the machine, and at its other end carrying a gear 152 which is engaging a driving gear 153 secured to the secondary shaft 17. On rotation of the shaft 151 with its cam disc 150 the latter will actuate the bell crank 146 to swing the squeeze comb 143 against the pleating comb during that part of a revolution which corresponds to the circular part of the periphery of the cam disc 150, and this movement is transmitted by the connection 145—144—143—142. When the circular part of the cam disc leaves its contact with the roller 148 a torsion spring 137 disposed at one end of the shaft 135 causes the shaft 135 with the squeeze comb 133 to swing the latter out of engagement with the pleating comb.

*The lining feed mechanism*

When stitching together the tie proper and the lining the stitching is performed along the adjoining edges of the lengthwise folded tie the latter being turned inside out. The lining is in that same operation stitched on along the tie proper and along its own axis of symmetry. The lining feed mechanism is arranged to supply a lining in correct position at the right moment during each cycle of operation.

The feed lining mechanism (see Figs. 1, 3, 4, 5, 6, 21, 24, 25, 26 and 27) is driven by the secondary shaft 17 and intermediate gears 153 and 152 from the shaft 151 which for this purpose near each end is provided with crank arms 154 and 155 of the same length, and extending in the same direction. Between each pair of cranks are supported crank bolts 156 pivotally connected to rods 157. These rods have axial borings in their free ends, and in these borings are disposed further rods 158 axially displaceable therein and at their free ends provided with bushings 159 rotatably supporting a shaft 160 therebetween. Coil springs (not shown) are housed in the borings of rods 157 and 158, and these springs are urging the rods 158 outwards. A stop device (not shown) in rods 157, 158 serves to limit the axial displacement of rods 158.

At the ends of the shaft 160 rollers 161 are rotatably supported, and arranged to run between U-shaped guides 162 (Fig. 4) secured to the machine frame by means of preferably welded arms 163, 164, which are secured to the machine frame by means of clamping blocks 165, 166 and bolts 167 this arrangement enabling height adjustment to be done. On rotation of the shaft 151 the shaft 160 will be reciprocatingly displaced on account of the movement of cranks 154, 155, and will run on the rollers 161 in the guides 162. To the lower member of one guide 162 is secured a plate 168 having a horizontally extending slot as at 169 and commencing from the middle part of that slot a depending vertical slot as at 170. A sleeve 171 is rigidly secured to shaft 160, and is supporting an arm 172 the free end of which carries a pin 173 rotatably carrying a roller arranged to engage the slots 169 and 170. The pin 173 has an attached tension spring 174 the other end of which is connected to the machine frame in such a manner that it urges the arm 172 to swing downwards (clock-wise in Fig. 4) so that the roller when moving along the slot 169 and arriving opposite slot 170 will be engaged by the latter and follow it, this causing the arm 172 and the shaft 160 to be rotated on the continued movement of shaft 160, the length of the slot 170 being so adjusted that the angular movement of the shaft 160 will amount to 90°.

On shaft 160 is supported catching mechanism for the lining comprising two essentially similar catching devices 175 and 176 (Figs. 3, 5 and 6) spaced apart at a distance substantially corresponding to the length of the lining. The devices 175 and 176 are displaceable along the shaft 160 but are secured against rotation by means of keys 177. Coil springs 178 and 179 are provided to urge the devices 175 and 176 against the bushing 159 in the rod 156 on one side, and against a collar 181 secured to the shaft 160 by means of a set screw 182 on the other side. The other ends of the springs abut against collars 183 secured to the shaft 160 by means of set screws 184. At the bottom of each catching device a roller 185 is rotatably supported by a pin 186. When the shaft 160 is positioned at the farther part of its travel relatively to the operator and to the table the catching devices are facing upwardly, and are in that position adapted to catch a lining from a container 9 attached to the rear part of the machine. The lining is being held between catching and clamping members disposed at the tops of the catching devices. Owing to the fact that the rollers 185 engage the edges of templates 187 and 188 the catching and clamping devices are being kept at a suitable distance from each other, and when shaft 160 is moving towards the operator and the table the catching devices will move apart and thus stretch the lining caught between them as a result of the edges of templates 187 and 188 being diverging and the actuation of the springs 178 and 179.

The templates 187 and 188 by means of bolts 189 are supported by brackets 190 and 191 secured to the frame.

The catching devices 175 and 176 (see Figs. 5, 6 and 26) comprise each a sleeve-shaped member 192 having an axially disposed bore in which is rigidly held a bushing 193 with a bore for shaft 160. At the sleeve 192 are fixed two diametrically opposed radially extending pins 194 pivotally supporting a U-shapen plate 195 by means of thickened portions 78 thereon this plate normally engaging a stationary plate 196 perpendicularly disposed relatively to the axis of sleeve 192, and held into engagement with the former by a tension spring 197. In that side of the plate 195 facing the plate 196 a dove-tailed recess 198 is machined. In that recess and radially relatively to the sleeve 192 is slidably disposed a plate 199 at its upper end provided with teeth 200, and with its bottom edge engaging a template 201 axially disposed on the sleeve 192, and secured thereto by means of a screw 202. The plate 199 is kept into engagement with the template 201 by means of a leaf spring 203 screws 204 securing the latter to plate 195. The spring has its free end introduced into a hole in the plate 199. The template 201 is so shaped that on swinging the plate 195 away from plate 196 the plate 199 will first be moved outwardly in a radial direction and after that inwardly again.

Plate 199 is shown in the drawing (see Fig. 26) in two positions, viz. with full lines in its normal clamping position, and with dot and dash lines in its open position.

When viewed from the side the plate 199 has immediately below the teeth 200 a recess 205 for the purpose of facilitating the catching of the lining, and on its rear side a projection 206 is provided the edge of which is situated close to the upper edge of the plate 196 when plate 195 is held in its normal position by the spring 197.

Each catching device 175 and 176 has on the side facing the rear side of the machine an arm 207 secured to one thickened portion of plate 195, and on the other side another arm 208 secured to the other thickened portion of plate 195. These arms serve to control the movements of the catching devices, the functioning of which will be more fully described later.

The linings are piled into the container 9 beforehand (see Figs. 24 and 25). The container has projections 217 with holes 180 by means of which it can be slipped over guide rods 10 in the rear part of the machine, and is thus easily interchangeable. When the shaft 160 is located in its far end position the catching devices 175 and 176 have their plates 199 disposed upwardly facing the bottom 209 of the container 9. Said bottom has transverse apertures 210 near its ends which latter consist of thin steel plates 211 and 212. The plates 199 on their combined rocking and upwardly directed movement catch the lowermost lining with their teeth 200. The ends of the lining after that drop down between plates 199 and plates 196, and are trapped on reversal of the plates 199 in that the projections 206 on plates 199 secure a reliable clamping of the lining. Between the bottom 209 of container 9 and its front wall 213 a narrow slit 214 is provided which allows the lining to be moved out of the container in a horizontal direction by the catching devices 175 and 176.

For controlling the movements of the catching devices 175 and 176 when bringing out a new lining one of the crank arms 154 and a collar 218 on shaft 151 are provided with radially extending arms 215 and 216 (Fig. 3) which on rotation of shaft 151 actuate the arms 207 on the catching devices to pivot plates 195 in order to catch the lining. On the continued rotation of shaft 151 the lining is transported by means of the mechanism 154—155—157—158—159—160 towards the table, and the catching devices are turned 90° by coaction between the slots 169—170 and the arm 172 whereby the lining being held between the catching devices 175 and 176 will be disposed in a vertical plane. On this movement towards the table the catching devices will at the same time move farther apart on account of the divergence of templates 187 and 188 the lining being stretched by the tension of springs 178 and 179. At the end of this operational cycle the lining will be disposed alongside the tie fabric as formerly described, and the shaft 160 will be located in its far end position. A new operation cycle is now to begin, and the table travels towards the operator. After a certain length of travel projections at the bottom of the table (not shown) will engage projections 217' on the cranks 158, and move the latter to a position where the catching devices 175 and 176 hold the lining close to the tie proper, which in the meantime has been fed down between the leaf springs 23. After that the pleating comb is closed about the tie and lining assembly and during the last part of the table travel towards the near end position the arms 208 on the catching devices are actuated by actuating members (not shown).

*The stitching mechanism*

The stitching mechanism (see Figs. 1, 2, 9, 10, 11 and 12) generally designed with reference numeral 388 in Figs. 1 and 2 is situated in the lower part of the machine and approximately along its center line, and extends outside one end of the machine.

The stitching mechanism is supported by a couple of angle bars 218 on the upper faces of which are disposed spacers 219 at the top having recesses with a semi-circular cross section in which recesses are supported rods 220 with a circular cross section. The rods are secured to the angle bars 218 by means of rivets 221.

The rods 220 serve as a track for the reciprocating parts of the stitching mechanism.

On the upper faces of the angle bars 218 spaced apart brackets 222 and 223 are provided which serve to support the stationary part of the mechanism as well as a sheet metal cover 224 provided with a hinged lid 378 to protect the mechanism from dust, fluff etc.

Along the center line of the mechanism a rod 225 with a square cross section is secured to the brackets 223 by means of rivets 226. The rod 225 serves as a supporting member for the arms 95 of the pleating comb when resting in their lowest horizontal position. The guide wedges 123 attached to the lower shank in that position rest against the rod 225.

The reciprocating parts of the stitching mechanism essentially consist of two carriages each comprising a channel-shaped member 227 and 228 respectively one being disposed inside the other. To each end of both members 227 and 228 are secured transverse bars 229, 379, 380 and 381 by means of rivets joining them to the flanges of the members 227 and 228. Reference numeral 229 refers to the front end bar on the carriage being the front one in the direction of operation, and reference numeral 379 designs the rear transverse bar of same while numerals 380 and 381 refer to the front and rear transverse bars respectively of the rear carriage. To the transverse bars are secured shafts 230 the free ends of which rotatably support rollers 231 adapted to run along the rods 220. Each carriage is supported by four rollers 231, and the carriages can move independently of each other.

The front carriage which comprises the member 227 and transverse bars with shafts and rollers is arranged to actuate the stitching needle, and to perform the stitching operation proper while the rear carriage comprising the member 228 with its attached parts brings about the pushing together and spacing apart of the elements of the pleating comb, and also supports a bracket device for the stitching needle.

Said bracket device consists of an elongated member 233 having a semi-circular shaped flute facing upwardly. Said fluted member is secured to an upstanding projection 232 on the rear transverse bar 381 of the rear carriage, and is by means of a soldered plate 236 secured to a similar projection 234 on the front end transverse bar 380. The fluted member 233 at its front end has an almost full circular cross section broken only by an axially disposed slot 235 facing upwards. From the projection 234 is laterally extending an arm 237 having at its end a semi-circular recess 238. The arm 237 is engageable with the pleating comb, and brings about the pushing together and pulling apart of the elements of said comb, when the rear carriage is traveling forwards and backwards. The recess 238 enables the arm 237 to be engaged between flanges 240 on a sleeve 239 disposed outside the rearmost pair of arms 95 of the pleating comb (see Fig. 18). Owing to the fact that the recess 238 opens upwards the pleating comb can perform its travel without being obstructed by the engagement with arm 237 the engagement then ceasing again to begin when the pleating comb returns to its lowest position.

For the stitching operation a needle 241 is provided (see Figs. 9, 28, 29 and 30) having an eye 242 at its point. To the rear end of the needle is attached preferably by soldering a plate 243 at its outer end having two holes 244. The needle 241 is arranged to slide in a needle guide 245 having an axially disposed bore for the needle, and slotted as at 246 along a greater part of its length. During the stitching operation the needle is urged forwards in the needle guide 245 its point protruding more and more out of the pointed front end of the needle guide. The plate 243 is guided in the slot 246, and serves to drive the needle. Close to the front upper end of the needle guide 245 is provided an axially disposed rib 247 with a rectangular cross section having a longitudinally disposed bore as at 248 for the thread. At its rear end the needle guide 245 is provided with a flange 249 serving to secure it axially in the needle bracket.

When the needle guide 245 is to be put into position in the fluted member 233 the rib 247 is introduced into the slot 235 whereby the needle guide will be secured against rotating. The rear transverse bar 379 of the front carriage carries an upstanding bracket 251 having a couple of eyes 256 pivotally supporting a shaft 252 carrying a plate 253 which is arranged to be rocked upwardly by means of a projection 255 this leaving free the upper face of the bracket 251 which is provided with two rigid upstanding pins 254. The plate 243 secured to the needle is placed against the upper face of bracket 241 so that the pins 254 will engage the holes 244, and the plate 253 which has clearance holes for the pins 254 is moved down against plate 243 and is kept pressed down by a spring (not shown). The driving of the needle is then caused by the movement of the front carriage. At the first part of the stitching operation both carriages are simultaneously moved forwards by means of a driving mechanism to be more closely described, and the needle 241 rests in its guide 245 without relative movement. The elements of the pleating comb are pushed together by the arm 237 the tie fabric being thus creased prior to the subsequent stitching. When the elements of the pleating comb are completely pushed together the connection between the carriages must be disestablished. The connecting parts comprise a hook 257 pivotally carried by a pin 259 supported between two projections 258 on the rear transverse bar of the front carriage. The hook 257 has a depending rear projection 260 adapted to engage with a projection 261 secured to the rear transverse bar 381 of the rear carriage, and has at its front end an upstanding projection 262 adapted to coact with a releasing device to be more closely described.

To the top of a number of the brackets 223 is secured an angle bar 263 (Fig. 27) between its ends supporting a catch member 265 pivotally attached to its vertical flange by means of a pin 266. The lower portion 267 of the catch member is curved at the rear, and the catch member is so balanced that it will normally rest in the position shown in Fig. 27. It will further be prevented to swing out of its normal position in another direction than counter-clockwise. When the carriages travel in the direction indicated by an arrow, and the projection 262 on the hook 257 connecting them to each other comes into engagement with the lower part 267 of the catch member 265 the front portion of hook 257 is pushed downwards, and its projection 260 is brought out of engagement with the projection 261 on the rear transverse bar of the rear carriage. The connection between the carriages then ceases, and only the front carriage continues its travel forward. On the travel back the catch 257 can freely pass down below catch 265 which latter is free to swing away. A torsion spring 215 around shaft 259 constantly urges catch 257 to swing clockwise (as seen in Fig. 27), and a stop 269 between projections 258 prevents the catch swinging beyond a horizontal position. When the front carriage on its return travel gets sufficiently close to the rear one the carriages will thus be automatically coupled together. The stitching mechanism will then be in order for the next operating cycle.

When the carriages on returning of the front carriage are to be re-connected the following mechanism is provided for softening the impact when the carriages abut (Figs. 5, 11 and 12):

In the lower portion of the rear transverse bar 379 of the front carriage two holes 270 are drilled at the same height, parallelly and longitudinally disposed. The holes 270 are interconnected by a slit 271 extending between the walls of holes 270 where closest to each other. To the rear transverse bar 381 of the rear carriage are secured two cylindrical rods 272 having their free ends connected by means of a plate 273 secured in axial slots at the ends of rods 272 by means of rivets 274. A plate 276 provided with holes for rods 272 is slipped over the latter, and is kept pressed outwards by springs 275 disposed around each rod. A resilient shock absorber between the carriages is constituted in that fashion. The plate 276 preferably has a facing of rubber or the like to further soften the impact when the carriages abut.

The driving of the stitching mechanism originates from the secondary shaft 17 which for that purpose has a crank arm 277 (see Fig. 2) at the free end of which is rotatably supported a cylindrical rod 278 at its free end provided with rack teeth 279 engaging a gear (not shown) secured to a shaft 280 that shaft being in its turn rotatably supported in the machine frame. Around shaft 280 is pivoted a plate 281 having two projections 282 rotatably supporting rollers 283 having circumferential grooves adapted to guide the rod 278. When the latter performs a reciprocating movement by rotation of the crank arm 277 the gear on shaft 280 will transmit a reciprocating rotation to the latter which by means of a conical gearing (not shown) is imparted to a chain wheel 284 rotatably disposed in the machine frame. A similar chain wheel 285 (see Fig. 1) is disposed at the other end of the machine, and a chain 286 is suspended around wheels 284, 285. This chain is connected to the front part of the front carriage.

The chain 286 is held taut by means of a tautening device comprising two arms 287 by means of a shaft 250 rockably disposed in the machine frame. Between the free ends of the arms a chain wheel 289 is supported on a shaft 288. The arms 287 are held in the adjusted position by means of a further arm 290 one end of which is secured to one of arms 287 by means of a bolt 291, its other end being secured to the machine frame by means of a bolt 292 engaging a longitudinally disposed slot 293 in the arm 290, adjustment thus being possible.

The stitching is performed in the following manner:

The needle 241 with the thread which is unwound from a spool 384 (see Fig. 38) located at the end portion of the stitching mechanism is moved forwards together with the needle guide 245 in the manner formerly described until the rear carriage driving the needle guide is released, when the needle alone will be moved forwards guided by the recesses 123a and 138 in the pleating comb and squeeze comb elements respectively. The needle thus will trail the thread through the pleated tie elements.

During its travel along the pleating comb the needle will firstly pass a guide member 294 (see Figs. 14, 15 and 18) which connects the outer ends of a number of the catching arms 95 disposed closest to the near end of the pleating comb. The guide member 294 has a through bore 295 which at its entrance end facing the needle is conically shaped to accommodate the pointed end of the needle guide 245. At the other end of the guide member 294 is disposed a shearing device for cutting the thread which will later be described. The adjacent few catching arms 95 which are neither adapted to being pushed together are connected by means of a guide member 382 having a through bore 383 for the needle.

Near the far end of the pleating comb a guide member 296 having a through bore 297 is disposed between two adjacent arms 95. The diameter of the bore 297 is such that on the return travel of the needle the free thread portion issuing from the needle eye 242 cannot move back with the needle, and will be caught by a retaining device to be described later. Only the needle itself thus travels back to its initial position.

The retaining device for the thread is constructed in the following manner (see Figs. 31 and 32):

To the square rod 225 is secured a transverse member 298 having a bore 299 for the needle and the thread, and another bore in which is lodged the one end portion of a shaft 300 the other end of which is supported by another transverse member 301 secured to rod 225. An arm 302 is secured to shaft 300 and is engaging the member 298 with its one side. This arm can be brought to close the bore 299. Close to the member 301 shaft 300 carries another arm 303 secured thereto, and having its free end connected to a forked member 305 by means of a link member 304 pivotally connected to a shaft 306 supported between its shanks. The member 305 is secured to an arm 307 having one end pivoted to a shaft 308 secured to one of brackets 223. The extreme end 309 of arm 307 which preferably is made less wide than the arm proper is adapted to engage a projection 311 on a catch member 310 being pivotally disposed around a shaft 312 secured between two plates 313 disposed at opposite sides of the rod 225. The catch member 310 is urged against the end of arm 309 by means of a leaf spring 314 secured to the under side of rod 225. A tension spring 315 having its one end attached to a projection 316 on the arm 307 and its other end attached to the machine frame is urging the arm 307 downwards, this movement being prevented by the catch 310 as long as the latter engages the arm. In the described position of the various parts the bore 299 for the needle and thread is not obstructed by the arm 302.

The needle 241 immediately before reaching its far end position penetrates the bore 299 and after that the bore 297 in guide 296 during its forward travel (see Figs. 14 and 15) thereafter it reverses its direction of travel the thread being prevented to travel back on account of the narrowness of the bore 297 as previously mentioned. To hold the thread safely the retaining device begins to function. This is brought about by an actuating device located at the upper branch of the chain 286. The actuating device comprises a pivotally disposed catch member 317 supported between two transversely extended chain elements 318, and normally kept in the position indicated in Fig. 32 by a spring 319. The elements 318 are secured to a link member 320 of the chain. When now the chain 286 moves back corresponding to the back travel of the needle the end face of the catch member 317 will actuate and move aside the catch member 310 the arm 307 being swung downwards by spring 315. By means of the connection 305—306—304—303 the arm 307 turns shaft 300, and consequently the arm 302 so that the bore 299 will be obstructed by the latter. A stop pin 321 secured to the transverse member 298 prevents an excessive movement of the arm 302. The thread will be trapped between the arm 302 and the transverse member 398, and on moving the needle 241 back the thread will run in the needle eye 242. Corresponding to the end position of the needle the thread is released in that a roller 324 adapted to rotate about a shaft 323 secured between link members 322 of the chain 286 will move the arm 307 back so that the catch member will again catch its end portion at the same time as shaft 300 will be turned back through the connection 305—306—304—303. The arm 302 then will move aside from the bore 299, and the thread is released.

When the needle has come back to its initial position, and the elements of the pleating comb have been pulled apart by the return travel of the rear carriage the thread has to be cut off before the stitched tie can be removed. The cutting off is done simultaneously with the opening of the pleating comb, a shearing device (see Figs. 18 and 19) being then actuated. This device comprises a stationary cutting member 325 secured to that end of the guide 294 facing away from the needle, and adapted to coact with a movable cutting member 326. The cutting member 325 is secured to the guide member 294 by means of a projection 327 disposed perpendicularly thereto. A leaf spring 329 preferably is secured with the same screw, and adapted to keep the movable cutting member 326 into engagement with the stationary one. The movement of cutting member 326 is controlled by a bar 330 slidably disposed at one of the catching arms 95 by means of pins 331 secured to the bar having elongated slots 332 to engage the pins. One end of bar 330 is connected to the end of cutting member 326 by means of rivets 333 and is connected to a link 335 by means of a pin 334. The link has its other end connected to an arm 336 by means of a pin 337. The arm 336 is secured to the hub of the opposite arm 95 this causing cutting member 326 to be moved against cutting member 325 upon opening of the arms 95. The thread located between the cutting members thus is cut off.

On the return travel of the needle the thread need be kept taut between its retained end and a point close to the spool. For this purpose the following device is provided (see Figs. 33, 34 and 35):

To a rod 338 resting in guides 339 below the flange of one angle bar 218 is rigidly secured a bracket 340 at the upper horizontal face of which are pivoted two arms 341 on pins 342. At their free ends the arms 341 are provided with transversally disposed pins 343 facing each other. The pins 343 are provided at their ends facing each other one with a projection 344 and the other with a slot 345 adapted to engage each other. The projection 344 is notched at the center of the pin to make it possible for the thread to run in said notch. If the pins are brought completely together the thread will be trapped. One end of the rod 338 has a projection 389 extending through a slot 390 in the bar 218. A projecting member on the chain 286 (not shown) is adapted to engage with a recess 390 at the end of the projection 391 during the last part of the forward travel of the chain. The rod 338 with attached parts will in the first place be imparted a forward and on the return travel of the stitching mechanism a return movement.

In its resting position the projection 389 is facing the chain 286 at the part thereof extending upwards against the chain wheel 285 the projection being introduced into the slot 391 in substantially a vertical direction, and is being released therefrom in the opposite direction. At one of the arms 341 is fulcrumed a transverse lever 346 by means of a pin 347. At one end the lever 346 is recessed as at 348 this recess being adapted to engage a projection 349 on the other arm 341. The arms 341 have projections 350 beyond the pins 343 between which projections is attached a tension spring 351 urging the pins 343 towards each other. A stop member 264 disposed between arms 341 prevents spring 351 to bring the arms so close that the thread is being too tightly squeezed between the pins.

The other end of the lever 346 is adapted to slide between a bar 353 and a leaf spring 392 secured to the top of said bar. The latter in its turn is secured to one of the brackets 223.

On the forward travel of the carriages and chain 286 the rod 338 with the bracket 340 and the parts supported by the latter will be moved forwards. Through the friction of lever 346 between the bar 353 and the spring 392 on the forward travel (in the direction of the arrow) the recess 348 at the other end of the lever will be swung into engagement with the projection 349 against the tension of spring 351. The pins 343 will be moved apart allowing the thread to run freely between them. When, however, the return travel commences the lever 346 is actuated in the opposite direction, and recess 348 will cease to engage projection 349. The spring 351 will simultaneously urge pins 343 together to squeeze the thread.

In order to move pins 343 apart at the last portion of the return travel the arms 341 at their bottom are each provided with a pin 352 adapted to cooperate with a bar 393 disposed in the direction of movement. The bar 393 is secured to one of brackets 223. When the pins contact the end of bar 393 the arms 341 are forced apart.

A hair pin spring 354 is secured to the side of bracket 340 by means of pins 355 and 356, and its free end is engaging the side of lever 346 in such a manner that it strives to keep the latter out of engagement with projection 349.

If the thread snaps the machine must be automatically stopped. For this purpose mechanism is provided (see Figs. 36 and 37).

Said mechanism comprises a U-shapen member 357 one shank of which is shorter than the other. Opposed to each other at the outer side of each shank are provided two aligned guide sleeves 358 each having a bore 359 for the thread. A slit 360 is provided in the upper portion of member 357 and guide sleeves 358, and extends into the bores of the latter. The slit 360 is provided in order to facilitate the swift restoring of the thread arrangement when the thread has snapped off.

At the end of the longer shank of the member 357 a leaf spring 363 is secured between pieces of insulating material 361 by means of rivets 362. At its free end the spring 363 carries an U-shapen further spring 364 at the shank ends of which and engaging each other on account of the spring force is secured a friction shoe 365 at each shank.

At the top end of spring 363, and in the corresponding part of spring 364 a slit for the thread is provided.

At the inside of the longer shank of member 357 a contact pin 366 is provided, and facing that a similar contact pin is secured to spring 363. Said contact pins are spaced apart when the thread passes the mechanism (in the direction of the arrow) on account of the pulling force in spring 364. If, however, the tension in the thread ceases to exist, or the thread snaps or gets used up the contact pins 366 come into contact. The contact pins are connected to an electric supply in any suitable manner (not shown). This supply can feed an electric relay or other device for controlling the driving motor.

In order to moderate the impacts when pushing together or pulling apart the elements of the pleating comb both sides of the bar 31 have brackets 394 secured thereto (see Figs. 14 and 15) which each support a U-shapen member 395 between the uprights of which is secured a shaft 396. The shafts 396 between them slidably support a transverse member 397. The middle part of this member is connected to the hub of one pair of arms 95 not adapted to be pushed together, and located farthest away from the initial position of the stitching mechanism. At both sides of said transverse member, and between that and the shanks of the members 395 springs 398 are provided. The transverse member 397 thus resiliently retains the connected catching member, and by the action of springs 398 the impacts are softened when pushing together and pulling apart the elements of the pleating comb.

The stitching thread 385 (see Fig. 38) which is unwound from a spool 384 disposed at the rear end of the stitching mechanism 388 around a rod 399 secured to a plate 389 attached to the framework of the stitching mechanism is adapted to run through a couple of stationary eyes 386 secured to a suitable part of the structure, and from there through the retaining device with its pins 343 previously described and along the needle guide 245 through the bore 248 in the rib 247, and finally from below through the needle eye 242. The eye of the needle is vertically disposed i. e. is facing upwards-downwards.

In order to prevent tangling of thread 385 on the return travel of the stitching mechanism the thread between the eyes 386 is kept taut by means of a loose ring 387 slipped over the thread, the weight of which is adapted to give the proper amount of tautening.

The mechanism previously described for indicating the snapping of the thread preferably is disposed adjacent to spool 384 and is not shown in Fig. 38. By means of said mechanism the thread is kept taut on the forward travel of the stitching mechanism.

*The ejecting device*

After stitching the tie and cutting off the thread the tie shall be removed from the machine. For this purpose a special ejecting device is provided which is constructed as follows:

In the longitudinal direction of the machine a shaft 367 is provided supported by brackets 368 secured to one of the longitudinal beams. To one end of shaft 367 is secured a sleeve 369 to which is rigidly attached a curve member 370 consisting of a rod bent to form a loop, and against the inner side of which a roller 371 is adapted to run. Roller 371 is rotatably supported by the bottom end of an arm 372 secured to the table.

On shaft 367 spaced sleeves 373 are provided having radially extending ejecting members 374 which are so disposed in relation to the arms of the pleating comb that they do not interfere with the latter. Said members are bent at their ends to retain the tie during the first phase of the ejecting operation. When the pleating comb has opened, and is travelling upwards with the stitched tie, and the table simultaneously moves away from the operator arm 372 by means of its roller 371 actuates curve 370 this causing shaft 367 to raise the ejecting members which catch the tie by their bent ends, and during the continued movement eject the same. At the free end of shaft 367 is provided a braking device comprising two blocks 375 each having a semicircular recess for the shaft, and being clamped together by means of screws 376 which can be tightened to a desired degree this allowing the braking effect to be adjusted. The protruding heads of screws 376 serve to prevent the braking device to follow the shaft in its rotation a pin 377 rigidly secured to the side of the adjacent bracket 368 serving as a stop member. The braking device is desirable in order to prevent too rapid movements of the shaft 367 at the moments when roller 371 is not engaging the curve member 370.

Figure 39:
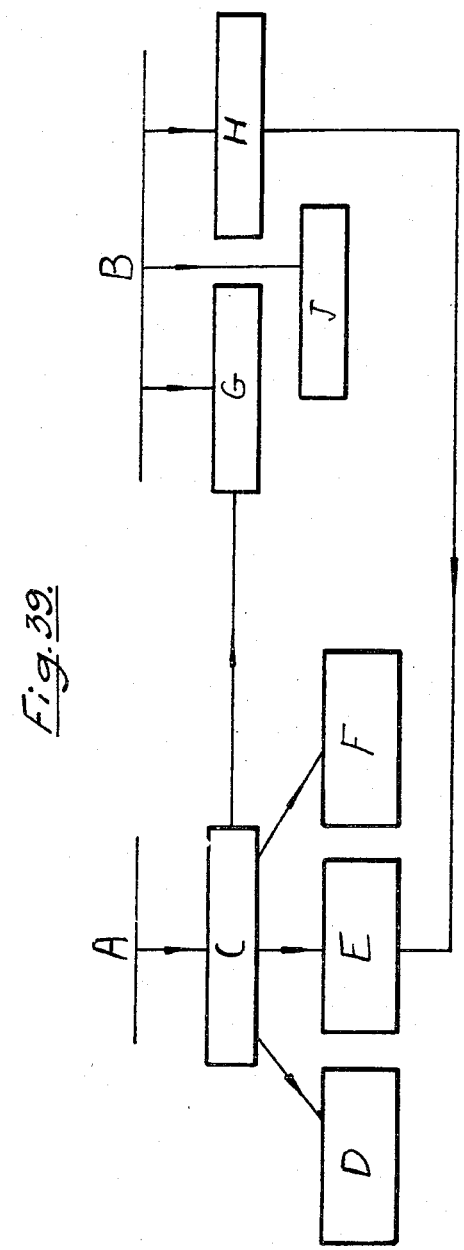
Fig. 39 is a diagram illustrating the various functions of the machine.

In order to facilitate the understanding of the functioning and cooperation of the separate mechanisms of the machine the attention is drawn to Fig. 39 wherein A designates the secondary shaft 16; C the work table, and D, E and F the folding device, the pleating device and the ejecting device respectively. The secondary shaft 17 is designated with B, and G, H and J are the lining feed device, the stitching mechanism and the squeeze comb respectively.

The coordination of operations is indicated by connecting lines and arrows.

Figure 40:
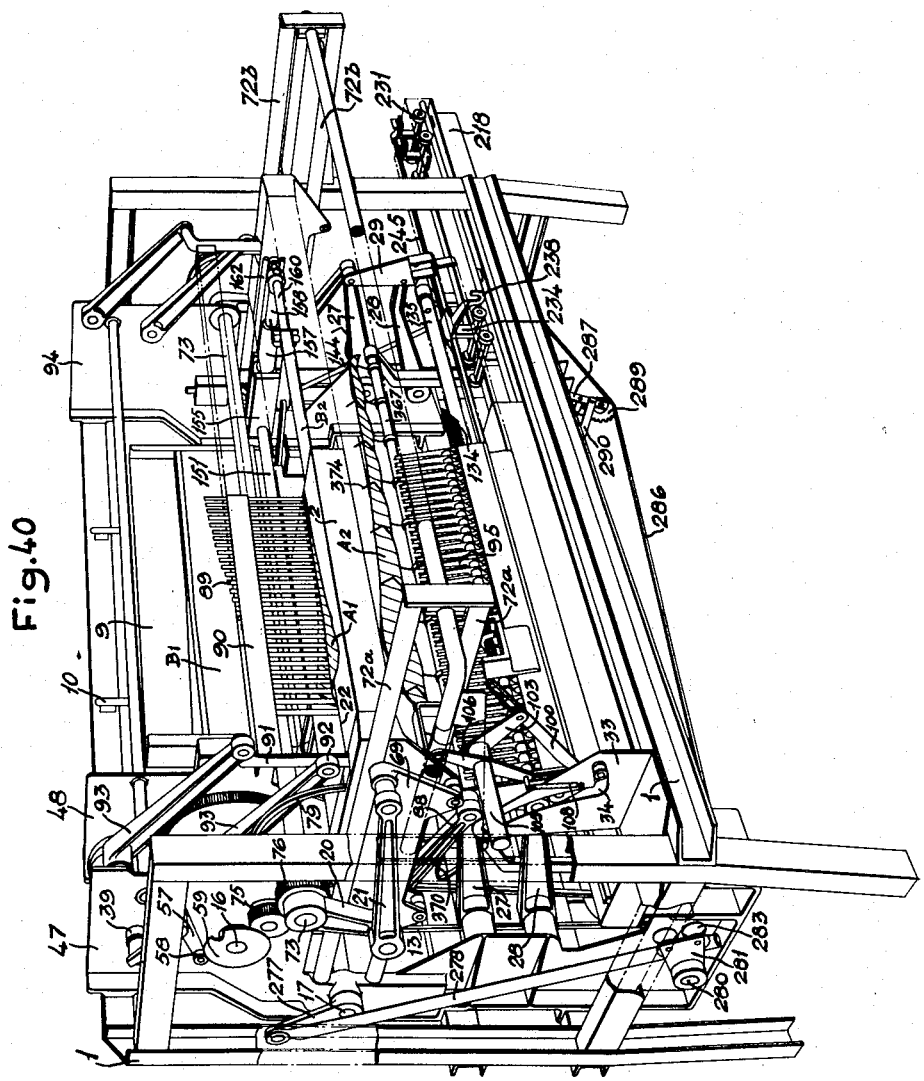
Fig. 40 is a perspective view of the machine.

In order to summarize the operating cycle of the machine, reference may be made to Figs. 1, 2 and 40.

A number of linings $B_1$ (Fig. 40) are piled into the shaped container 9, before commencing the actual operation of the machine (Figs. 1, 24, 25, 40). Figures 24 and 25 illustrate the shape of the container. Thereafter container 9 is put into its position in the machine in which it is guided and retained by the rods 10. It is recommended that at least two containers be provided, one being loaded outside the machine, while the other is in its operative position progressively to feed out one lining during each operational cycle. When the container in use in the machine runs empty, the containers are switched, and the empty one is reloaded.

Before the machine is started a tie blank $A_1$ (Figs. 1 and 40) is placed on top of table 2 in such a manner that it is symmetrically disposed above the longitudinal slot 22 in the table. In order to accurately establish the position of the tie blank relatively to said slot suitable guide means outlining the tie blank with respect to the slot may be provided (not shown in the drawings). The operator then actuates the pedal 19 (Fig. 13) wherethrough the automatic operation of the machine is started.

The table 2 which was disposed at its forward position before the beginning of the operation cycle is displaced towards its rear position, and the folding device 89, 90 (Figs. 1 and 40), the movements of which are actuated by the table, simultaneously starts to descend. Its teeth or ribs 89 pass through slot 22 in table 2 (Fig. 40) the tie blank $A_1$ being consequently folded symmetrically lengthwise about the line of ribs 89 and forced down through the slot, below which it is caught and retained in folded disposition between the leaf springs 23 (Fig. 1) secured along both sides of slot 22 and extending down from the underside of the table. When the table 2 moves rearwards the arm 372 (Fig. 21) which extends down from its left side, actuates the curve member 370 (Figs. 21 and 40) so that the tie ($A_2$, Fig. 40) completed in the preceding cycle, will be ejected by the ejecting device.

Further, when the table 2 commences its displacement it pushes the shaft 160 (Figs. 1, 40) arranged parallel thereto before it. On said shaft the lining catching devices 175, 176 (Fig. 3) are disposed.

A lining $B_2$ which was drawn from container 9 during the last part of the preceding cycle is kept taut between the catching devices 175, 176 and will be in position beside the row of leaf springs 23 extending down from the table until the rearward movement of the table is finished. The tie blank $A_1$ and the lining $B_1$ having been brought together in juxtaposition are thence treated as a single unit. The pleating comb with its arms 95 (Fig. 40) is driven from the table to rise from its rest position on the stitching mechanism, said arms enclosing the tie assembly from both sides, the lining being placed beside the tie blank. It is to be noted that the lining is placed on the outside of the row of leaf springs 23, the folded tie blank being held between the springs, and that in this machine the whole assembly is treated with the wrong side out and has to be turned right side out after having been stitched. The arms 95 close around the assembly, and the pleating device returns to its lowermost position in which it is rotated 90° so that the arms are disposed horizontally. Simultaneously the table moves back to its forward position. The arms 95 are pushed together to pleat the tie assembly in folds transverse to its length, and the squeeze comb 133 (Figs. 21, 22 and 23) is brought down against the folded fabric in order to secure the folds in position for stitching. The longitudinal stitch, commonly used to hold a tie together, secures the lining to the tie blank and at the same time joins together the two long edges of said blank. The stitching is performed on the folded blank, the arms 95 of the folding device are moved apart and opened, and leave the tie assembly free to be caught by the ejecting members 374 to be ejected at the beginning of next operation cycle as mentioned before.

Simultaneously with the stitching together of the two tie components $A_1$ and $B_2$ a fresh lining $B_1$ is drawn out of the container 9 by the lining catching devices 175, 176 and is held ready for next operation cycle.

This invention is not limited to the embodiment shown and described. Many modifications are possible. The gear box for instance can be substituted by two driving motors adapted alternatingly to drive the secondary shafts. The mechanisms and parts can be modified between wide limits without departing from the underlying principles of the invention.

Having thus described my invention I claim as new and desire to secure by Letters Patent:

1. An automatic machine of the class described, comprising in combination, a frame structure having mounted thereon a driving motor, a gear box, a work table having a longitudinal slit, a folding member for folding tie fabric lengthwise and feeding it down through said slit, and linkage connecting said motor through the gear box to the work table and to the folding member, resilient members under said table on either side of said slit to receive and hold said symmetrically folded tie fabric, a lining container positioned parallel to said resilient members and means for seizing a lining fabric from said container and bringing it into position adjacent folded tie fabric, means for catching the tie assembly and moving it into a stitching position, means for pleating said tie assembly, means to perform the stitching operation and ejecting means to discharge the product.

2. In an automatic machine of the type described, in combination, a frame structure having mounted thereon a driving motor, a gear box driving at least two secondary shafts adapted to be alternately and consecutively rotated during each rotated cycle of the machine, a work table having a longitudinal slit therein, said work table being operatively connected to one of said shafts to derive therefrom a reciprocating movement, a folding member for folding the tie fabric lengthwise and feeding it down through said slit in said work table, said folding member being operatively connected to said work table, resilient members attached to the underside of said work table to receive and hold said folded tie fabric, a lining container on said frame parallel to said resilient members and means for seizing a lining fabric from said container and bringing it into position adjacent to the tie fabric, said lining mechanism being operatively connected to the second of said shafts, means for moving the tie assembly into stitching position, said means being operatively connected to said work table, stitching mechanism to perform the stitching operation, said stitching mechanism being operatively connected to said second shaft, and ejecting mechanism to discharge the product, said mechanism being operatively connected to said work table.

3. In an automatic machine of the class described, in combination, a frame structure having mounted thereon a driving motor, a gear box driving secondary shafts adapted to be alternately and consecutively rotated during each cycle of the machine and a work table having a longitudinal slit therein, said work table being connected to one of said shafts and being provided with roller elements and guide members adjacent to said table for travel of said table, a folding member for folding the tie fabric symmetrically lengthwise and feeding it down through said slit to depths along the length of said fabric proportional to the width of the tie at those points, resilient members under said table to receive and hold the folded tie fabric, means for moving said tie into stitching position, means for pleating said tie assembly transversely of its length, stitching mechanism to perform the stitching operation and discharge means for casting out the product.

4. In an automatic machine of the class described, in combination, a frame structure, a driving motor, a gear box, a work table having a longitudinal slit therein, and linkage connecting said motor through shafts and the gear box to the work table, said work table being mounted to perform a reciprocating movement during its operation, a folding member carried by said work table and driven therewith for folding tie fabric symmetrically lengthwise and feeding it down through said slit, said folding member being swingably supported by said frame structure and operatively connected to link members to cooperate with guide members on said table to impart to said folding member a reciprocating vertical movement down to and up from said slit in said table, resilient members under said table to receive and hold folded tie fabric, a lining container positioned parallel to said resilient members and mechanism for seizing a lining fabric from said container and bringing it in position beside the tie fabric proper, means for moving the tie assembly into stitching position, said means being adjustable transversely of the machine, thereby to pleat the tie assembly, stitching mechanism to perform the stitching operation and ejecting mechanism to discharge the product.

5. In an automatic machine of the class described, in combination, a frame structure, a driving motor, a gear box and a work table having a longitudinal slit therein of a length sufficient to receive a length of tie fabric, and linkage connecting said motor through the gear box to the work table, a folding member carried by said table and driven therewith through said linkage above said slit for folding the tie fabric symmetrically lengthwise and feeding it down through said slit, the folding member comprising a structural element parallel to the work table carrying a plurality of adjustable ribs, the ends of said ribs defining a curve, the depth of said curve from the supporting member being directly proportional to the width of the necktie at said point, resilient members under said table to receive and hold folded tie fabric, a lining container adjacent to said means for receiving the tie fabric and means for seizing a lining fabric from said container and bringing it into position beside the folded tie fabric, means comprising a plurality of fingers for catching the tie assembly from the said resilient members and pleating said assembly across the length thereof to form a pleated unit and stitching mechanism to stitch said pleated unit and an ejecting means for discharging the product.

6. In an automatic machine of the class described, in combination, a frame structure, a driving motor, a gear box, a work table having a longitudinal slit therein, linkage connecting the motor through the gear box to the work table for reciprocating movement thereof, a folding member for folding the tie fabric symmetrically lengthwise and feeding it through said slit connected through said linkage for coordinated movement with said work table, resilient members under said table to receive and hold said folded tie fabric, said resilient members comprising leaf springs in pairs secured opposite each other on either side of said slit, a lining container adjacent said leaf spring holders and means for seizing a lining fabric from said container and bringing it in position beside said folded tie fabric and means for catching a tie assembly from said holding springs and moving it to a stitching position, means bringing said tie grasping means together to pleat the tie assembly transversely of its length and stitching mechanism to stitch said parts together and ejecting mechanism to discharge the product.

7. In an automatic machine of the class described, in combination, a frame structure, a driving motor, a gear box, a work table having a longitudinal slit therein, linkage connecting the motor through the gear box to the work table, a folding member connected through said linkage for coordinated movement with said work table for folding the tie fabric lengthwise and feeding it through said slit, resilient members attached to the underside of said table to receive and hold said tie fabric in its folded condition, a lining container positioned adjacent and parallel to said resilient members, said container being provided with a slit for the passage of a single lining and means for seizing a lining from said container and passing it to position adjacent to the folded tie fabric, said means comprising fingers to clutch the ends of said lining fabric and means to bring said fingers carrying said lining from a position close to said container to a position adjacent to said resilient members holding the folded tie fabric, means comprising additional fingers mounted on a horizontal shaft for catching the folded tie fabric and assembly to move it to stitching position, said fingers being movable longitudinally together on said shaft to pleat said assembly transversely to its length and stitching mechanism for stitching the pleated assembly and ejecting mechanism to discharge the product.

8. In an automatic machine in accordance with claim 7, a mechanism for seizing one lining at a time from said lining container comprising a shaft rotatably disposed in a frame structure and operatively connected to a secondary shaft of the gear box, said shaft provided with a crank member at each of its ends, said crank members being operatively connected to telescopically disposed arms, said arms rotatably supporting between their respective ends a bar member, said bar member being provided with catching device for said linings axially displaceably disposed thereon, said bar member further being provided with an arm member, said arm member being operatively connected to guide means attached to said frame structure, said means and said arm being operative to turn said bar member through an arc of 90° in the travel of same, said catching device holding said lining between them being urged to shift said lining from a horizontal position to a vertical position upon the travel of said bar member between its respective end positions.

9. In an automatic machine according to claim 8, guide means attached to the frame structure for limiting the axial displacement of the catching devices, resilient spring means to ensure the contact between said devices and said guide means, said devices being provided with toothed members for seizing and clutching a lining during the transport thereof, said spring means adapted to tighten said lining during its travel, actuating means to release said lining upon gaining its end position.

10. In an automatic machine of the class described, in combination, a frame structure, rockably disposed arms at each end of said frame structure, a guide member at one end of said frame structure, said frame structure also carrying a driving motor, a gear box, a work table having a longitudinal slit, and a folding member for folding the tie fabric lengthwise and feeding it down through said slit, resilient members attached to the underside of said table to receive and hold said tie fabric, arms rockably disposed at each end of said table, said last-mentioned arms being connected to the ends of said first-mentioned arms to rotatably support between their ends means for catching the tie assembly and transporting it to stitching position, said guide member being adapted to rotate said mechanism during travel from the vertical to horizontal position, means for pleating said tie assembly transversely to its length, and stitching mechanism to perform the stitching operation and ejecting means to discharge the product.

11. In an automatic machine according to claim 10, a catching mechanism for the tie assembly comprising a channel-shaped structural member carried on said frame structure, end pieces thereon, a longitudinally disposed rod member supported between said end pieces, and an oval-shaped shaft rotatably supported between said end pieces parallel to said rod, a plurality of scissor-shaped elements supported on said rod member, said elements having extended members for catching said tie assembly and having their opposite shanks in cooperative relation with said oval shaft, tension springs provided between each pair of said shanks to urge said members together, the position of said structural member being dependent upon displacement of said table, said oval-shaped rod being operatively connected to said table to close and open said extending members in correspondence to the position of said table.

12. In an automatic machine according to claim 11, mechanism for pleating the tie assembly transversely, said mechanism comprising a carriage operatively engageable with said tie catching mechanism, guide members secured to the frame structure of the machine, said carriage being adapted for travel along said guide members, said devices being axially displaceable to a limited extent to pleat said tie assembly transversely in dependence on the travel of said carriage.

13. In an automatic machine according to claim 12, mechanism for pleating the tie assembly transversely wherein said structural member is rotatably disposed in the frame structure of the machine parallel to the position of said work table and is adapted to be actuated by means of a driving connection to the gear box of the machine, projecting elements on the tips of said scissor-shaped members adapted to fall between the scissor-shaped members to keep the tie fabric held in transverse pleats, said elements having notches therein to permit passage of a stitching needle therethrough.

14. In a machine of the class described, in combination a frame structure, a driving motor carried thereby, a gear box thereon and connected to said motor, and a work table having a lengthwise slit therein, linkage connecting the gear box to the work table, a folding member connected through said linkage for coordinated movement with said work table, for feeding tie fabric into the slit and folding it as it is fed, resilient members attached to the underside of said table to receive and hold said tie fabric when it passes through said slit, a lining container positioned parallel to said resilient members, and mechanism for seizing a lining fabric from said container and bringing it into position beside the tie fabric, mechanism for catching the tie assembly and moving it into stitching position, means for pleating said tie assembly transversely, stitching mechanism to perform the stitching operation, said stitching mechanism comprising a rail structure secured to said frame structure and carriages formed to run along said rail structure, one of said carriages being connected to said pleating means to bring the elements of said pleating means together, said carriage being provided with a needle guide for a stitching needle, and with coupling means for connecting it to the other of said carriages, said other carriage being connected to said stitching needle and provided with means operatively connected to a driving chain, said driving chain being operatively connected to the gear box.

15. In a machine of the class described, in combination a frame structure, a driving motor carried thereby, a gear box thereon and connected to said motor, a reciprocable work table carried in said frame structure having a lengthwise slit therein, linkage connecting the gear box to the work table, a folding member connected through said linkage for coordinated movement with said work table for feeding the tie fabric lengthwise through said slit and folding it symmetrically lengthwise as it is fed, resilient members attached to the underside of said table to receive and hold said folded tie fabric, a lining container positioned adjacent and parallel to said resilient members and mechanism for seizing a lining fabric from said container and bringing it into position beside the tie fabric proper, mechanism for catching the tie assembly and moving it into stitching position, means for pleating said tie assembly transversely of its length, means for squeezing said tie assembly in said pleated position, stitching mechanism to perform the stitching operation and ejecting mechanism to throw out the finished product, said ejecting mechanism comprising a shaft held in said frame parallel to said pleating mechanism, a curved member on said shaft, an arm member secured to said work table to impart to said shaft a swinging movement determined by the travel of said table, said curved member adapted to cooperate with said arm, radially extending arms on said shaft operative to catch and eject the finished tie, said arms being formed at their extreme ends to securely catch said tie.

16. An automatic machine for folding a planiform article, said machine having a common gear box, a folding mechanism and a work table having a slot therein, said parts being driven from said gear box, said folding mechanism comprising a curved shaped member mounted over said table and driven reciprocally into and out of said slot through connection to said gear box, and a linkage system supporting said work table, tracks on which said table is driven in a horizontal reciprocating path, said curved shaped member being movable in a path with vertical and horizontal components, the horizontal component of movement being coordinated with reciprocating movement of the work table.

References Cited in the file of this patent

UNITED STATES PATENTS

| Number | Name | Date |
| --- | --- | --- |
| 2,065,754 | Schramm | Dec. 29, 1936 |
| 2,294,090 | Malck | Aug. 25, 1942 |
| 2,374,033 | Newman | Apr. 17, 1945 |